(12) United States Patent
Sakhnini et al.

(10) Patent No.: US 11,564,235 B2
(45) Date of Patent: Jan. 24, 2023

(54) DYNAMIC INDICATION OF THE TCI/QCL FOR DYNAMIC CORESETS

(71) Applicant: QUALCOMM Incorporated, San Diego, CA (US)

(72) Inventors: Iyab Issam Sakhnini, San Diego, CA (US); Tao Luo, San Diego, CA (US); Qiang Wu, San Diego, CA (US); Jun Ma, San Diego, CA (US); Xiaoxia Zhang, San Diego, CA (US); Jing Sun, San Diego, CA (US); Juan Montojo, San Diego, CA (US); Peter Gaal, San Diego, CA (US); Mehmet Izzet Gurelli, San Diego, CA (US); Ahmed Abdelaziz Ibrahim Abdelaziz Zewail, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 17/195,374

(22) Filed: Mar. 8, 2021

(65) Prior Publication Data

US 2021/0321406 A1 Oct. 14, 2021

Related U.S. Application Data

(60) Provisional application No. 63/008,961, filed on Apr. 13, 2020.

(51) Int. Cl.
| | |
|---|---|
| *H04W 4/00* | (2018.01) |
| *H04W 72/04* | (2009.01) |
| *H04W 80/02* | (2009.01) |
| *H04L 27/26* | (2006.01) |
| *H04W 76/27* | (2018.01) |

(52) U.S. Cl.
CPC ... *H04W 72/0493* (2013.01); *H04L 27/26025* (2021.01); *H04W 72/042* (2013.01); *H04W 72/0446* (2013.01); *H04W 72/0453* (2013.01); *H04W 76/27* (2018.02); *H04W 80/02* (2013.01)

(58) Field of Classification Search
None
See application file for complete search history.

(56) References Cited

U.S. PATENT DOCUMENTS

2020/0314811 A1* 10/2020 Lin .................. H04L 5/0053
2020/0351892 A1* 11/2020 Yi .................... H04W 8/24

OTHER PUBLICATIONS

International Search Report and Written Opinion—PCT/US2021/099892—ISA/EPO—dated Jun. 8, 2021.

(Continued)

*Primary Examiner* — Zewdu A Beyen
(74) *Attorney, Agent, or Firm* — Patterson & Sheridan, L.L.P.

(57) ABSTRACT

Aspects of the present disclosure relate to a technique for determining quasi co-location (QCL) and/or transmission configuration information (TCI) state assumption information for a dynamic control resource set (CORESET). A user equipment (UE) may receive and/or detect a downlink control information (DCI) that schedules at least one dynamic CORESET and indicates a TCI state from a list of one or more TCI states for the dynamic CORESET. The UE may apply the indicated TCI state for processing physical downlink control channel (PDCCH) transmissions in the dynamic CORESET when one or more conditions are met.

30 Claims, 16 Drawing Sheets

(56) References Cited

OTHER PUBLICATIONS

Nokia., et al., "FL Summary Cross-Carrier Scheduling with Different Numerology", 3GPP TSG-RAN WG1 #100, 3GPP Draft; R1-2001068, 3rd Generation Partnership Project (3GPP), Mobile Competence Centre; 650, Route Des Lucioles; F-06921 Sophia-Antipolis Cedex; France, vol. RAN WG1, No. E-meeting; Feb. 18, 2020-Mar. 6, 2020, Feb. 17, 2020 (Feb. 17, 2020), 17 Pages, XP051853641.

Qualcomm Incorporated: "CR for Default QCL Assumption for Rel. 16 Cross-Carrier Scheduling", 3GPP TSG-RAN WG1 #100-e, R1-2000983, 3rd Generation Partnership Project (3GPP), Mobile Competence Centre; 650, Route Des Lucioles; F-06921 Sophia-Antipolis Cedex; France, vol. RAN WG1, No. Feb. 24, 2020-Mar. 6, 2020, Feb. 15, 2020 (Feb. 15, 2020), 5 Pages, XP051853556.

\* cited by examiner

DYNAMIC INDICATION OF THE TCI/QCL FOR DYNAMIC CORESETS

CROSS-REFERENCE TO RELATED APPLICATION

This application claims benefit of and priority to U.S. Provisional Patent Application No. 63/008,961, filed Apr. 13, 2020, which is hereby incorporated by reference in its entirety.

BACKGROUND

Field of the Disclosure

Aspects of the present disclosure relate to wireless communications, and more particularly, to techniques for determining quasi co-location (QCL) assumptions for dynamic control resource sets (CORESETS).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd generation partnership project (3GPP) long term evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more BSs may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a BS, 5G NB, next generation NodeB (gNB or gNodeB), TRP, etc.). A BS or DU may communicate with a set of UEs on downlink (DL) channels (e.g., for transmissions from a BS or to a UE) and uplink (UL) channels (e.g., for transmissions from a UE to a BS or DU).

These multiple access technologies have been adopted in various telecommunication standards to provide a common protocol that enables different wireless devices to communicate on a municipal, national, regional, and even global level. New Radio (NR) (e.g., $5^{th}$ generation (5G)) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on a DL and on an UL. To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a user equipment (UE). The method generally includes receiving a downlink control information (DCI) that schedules at least one dynamic control resource set (CORESET) and indicates a transmission configuration indicator (TCI) state, from a list of one or more TCI states, for the dynamic CORESET; determining whether to apply the indicated TCI state for processing physical downlink control channel (PDCCH) transmissions in the dynamic CORESET if one or more conditions are met; and receiving a PDCCH in the dynamic CORESET in accordance with the determination.

Certain aspects of the present disclosure provide a method for wireless communications by a network entity. The method generally includes sending, to a UE, a DCI that schedules at least one dynamic CORESET and indicates a TCI state, from a list of one or more TCI states, for the dynamic CORESET; determining whether the UE is to apply the indicated TCI state for processing PDCCH transmissions in the dynamic CORESET if one or more conditions are met; and sending the UE a PDCCH in the dynamic CORESET in accordance with the determination.

Certain aspects provide an apparatus for wireless communications by a UE. The apparatus generally includes at least one processor and a memory configured to receive a DCI that schedules at least one dynamic CORESET and indicates a TCI state, from a list of one or more TCI states, for the dynamic CORESET; determine whether to apply the indicated TCI state for processing PDCCH transmissions in the dynamic CORESET if one or more conditions are met; and receive a PDCCH in the dynamic CORESET in accordance with the determination.

Certain aspects provide an apparatus for wireless communications by a network entity. The apparatus generally includes at least one processor and a memory configured to send, to a UE, a DCI that schedules at least one dynamic CORESET and indicates a TCI state, from a list of one or more TCI states, for the dynamic CORESET; determine whether the UE is to apply the indicated TCI state for processing PDCCH transmissions in the dynamic CORE- SET if one or more conditions are met; and send the UE a PDCCH in the dynamic CORESET in accordance with the determination.

Certain aspects provide an apparatus for wireless communications by a UE. The apparatus generally includes means for receiving a DCI that schedules at least one dynamic CORESET and indicates a TCI state, from a list of one or more TCI states, for the dynamic CORESET; means for determining whether to apply the indicated TCI state for processing PDCCH transmissions in the dynamic CORESET if one or more conditions are met; and means for receiving a PDCCH in the dynamic CORESET in accordance with the determination.

Certain aspects provide an apparatus for wireless communications by a network entity. The apparatus generally includes means for sending, to a UE, a DCI that schedules at least one dynamic CORESET and indicates a TCI state, from a list of one or more TCI states, for the dynamic CORESET; means for determining whether the UE is to apply the indicated TCI state for processing PDCCH transmissions in the dynamic CORESET if one or more conditions are met; and means for sending the UE a PDCCH in the dynamic CORESET in accordance with the determination.

Certain aspects of the subject matter described in this disclosure can be implemented in a computer readable medium storing computer executable code thereon for wireless communications. The computer readable medium comprises code for receiving a DCI that schedules at least one dynamic CORESET and indicates a TCI state, from a list of one or more TCI states, for the dynamic CORESET; code for determining whether to apply the indicated TCI state for processing PDCCH transmissions in the dynamic CORESET if one or more conditions are met; and code for receiving a PDCCH in the dynamic CORESET in accordance with the determination.

Certain aspects of the subject matter described in this disclosure can be implemented in a computer readable medium storing computer executable code thereon for wireless communications. The computer readable medium comprises code for sending, to a UE, a DCI that schedules at least one dynamic CORESET and indicates a TCI state, from a list of one or more TCI states, for the dynamic CORESET; code for determining whether the UE is to apply the indicated TCI state for processing PDCCH transmissions in the dynamic CORESET if one or more conditions are met; and code for sending the UE a PDCCH in the dynamic CORESET in accordance with the determination.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
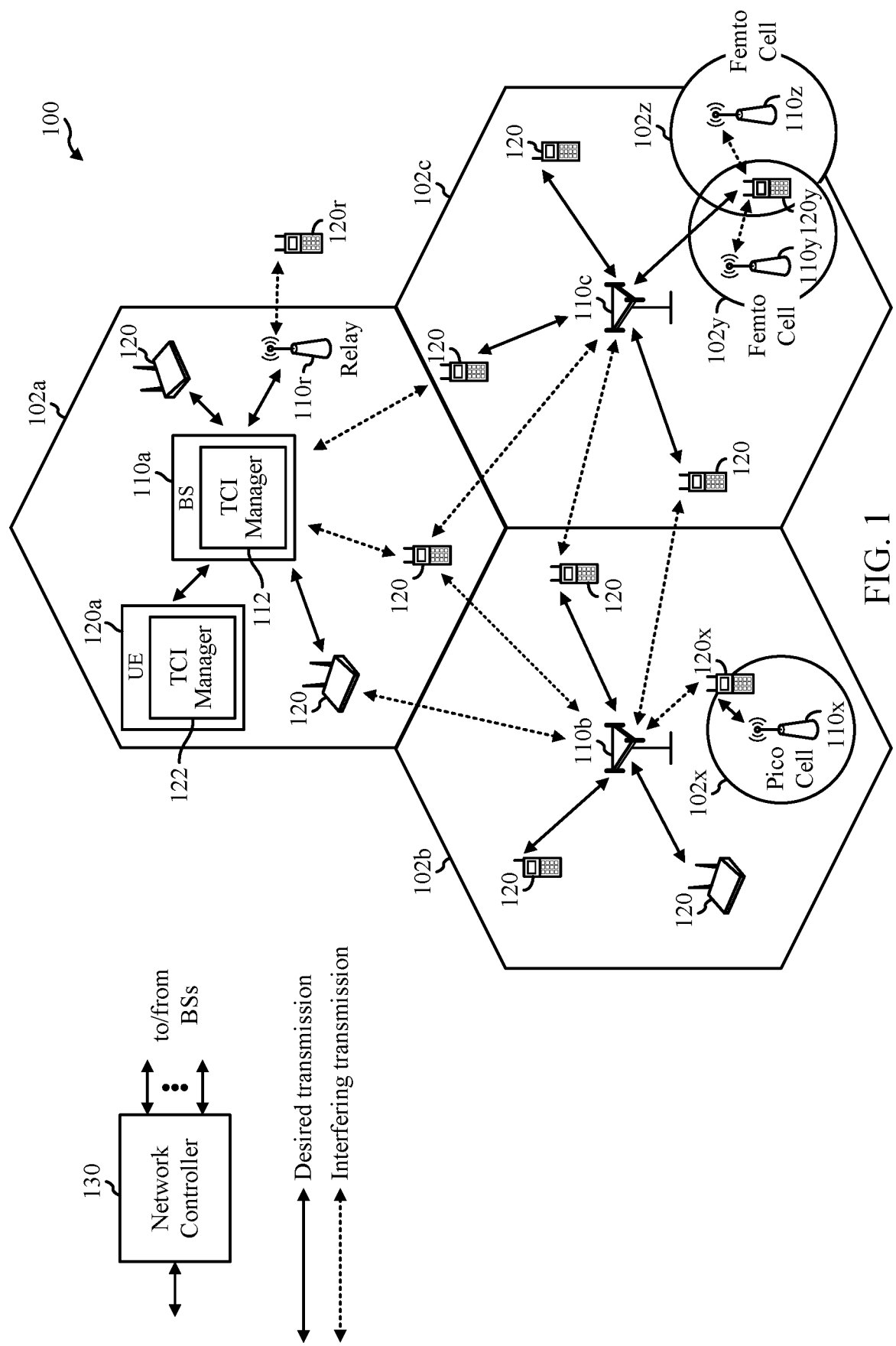
FIG. 1 is a block diagram conceptually illustrating an example telecommunications system, in accordance with certain aspects of the present disclosure.

Aspects of the present disclosure provide apparatus, devices, methods, processing systems, and computer readable mediums for determining quasi co-location (QCL) assumptions for a dynamic control resource sets (CORESET). As will be described in greater detail below, a user equipment (UE) may receive and/or detect a downlink control information (DCI) that schedules the dynamic CORESET and indicates a transmission configuration indicator (TCI) state for the dynamic CORESET. The UE may apply the indicated TCI state for processing physical downlink control channel (PDCCH) transmissions in the dynamic CORESET if one or more conditions are met.

The following description provides examples of techniques for determining QCL assumptions for dynamic CORESETS, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless communication technologies, such as long term evolution (LTE), code division multiple access (CDMA), time division multiple access (TDMA), frequency division multiple access (FDMA), orthogonal frequency division multiple access (OFDMA), single-carrier frequency division multiple access (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as new radio (NR) (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

NR is an emerging wireless communications technology under development in conjunction with the 5G Technology Forum (5GTF). 3GPP LTE and LTE-Advanced (LTE-A) are releases of the UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

NR access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. Multiple input multiple output (MIMO) transmissions with precoding may also be supported. MIMO configurations in a downlink (DL) may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Example Wireless Communications System

FIG. 1 illustrates an example wireless communication network 100 (e.g., an NR/5G network), in which aspects of the present disclosure may be performed. For example, the wireless communication network 100 may include base stations (BSs) 110 and/or user equipments (UEs) 120 configured for determining quasi co-location (QCL) assumptions for dynamic control resource sets (CORESETS). As shown in FIG. 1, a UE 120a includes a TCI manager 122 configured to perform operations 1100 of FIG. 11. A BS 110 includes a TCI manager 112 configured to perform operations 1200 of FIG. 12.

The wireless communication network 100 may be a new radio (NR) system (e.g., a 5$^{th}$ generation (5G) NR network). As shown in FIG. 1, the wireless communication network 100 may be in communication with a core network. The core network may in communication with one or more BSs 110a-z (each also individually referred to herein as a BS 110 or collectively as BSs 110) and/or UEs 120a-y (each also individually referred to herein as a UE 120 or collectively as UEs 120) in the wireless communication network 100 via one or more interfaces.

As illustrated in FIG. 1, the wireless network 100 may include a number of BSs 110 and other network entities. A BS 110 may be a station that communicates with UEs 120. Each BS 110 may provide communication coverage for a particular geographic area. In 3GPP, the term "cell" can refer to a coverage area of a NodeB (NB) and/or a NodeB subsystem serving this coverage area, depending on the context in which the term is used. In NR systems, the term "cell" and next generation NodeB (gNB), NR BS, 5G NB, access point (AP), or transmission reception point (TRP) may be interchangeable. In some examples, a cell may not necessarily be stationary, and the geographic area of the cell may move according to the location of a mobile BS 110. In some examples, the BSs 110 may be interconnected to one another and/or to one or more other BSs 110 or network nodes (not shown) in wireless communication network 100 through various types of backhaul interfaces, such as a direct physical connection, a wireless connection, a virtual network, or the like using any suitable transport network.

A BS 110 may provide communication coverage for a macro cell, a pico cell, a femto cell, and/or other types of cells. A macro cell may cover a relatively large geographic area (e.g., several kilometers in radius) and may allow unrestricted access by UEs 120 with service subscription. A pico cell may cover a relatively small geographic area and may allow unrestricted access by UEs 120 with service subscription. A femto cell may cover a relatively small geographic area (e.g., a home) and may allow restricted access by UEs 120 having an association with the femto cell (e.g., UEs 120 in a closed subscriber group (CSG), UEs 120 for users in the home, etc.). A BS 110 for a macro cell may be referred to as a macro BS. A BS 110 for a pico cell may be referred to as a pico BS. A BS 110 for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS 110 may support one or multiple (e.g., three) cells.

The wireless communication network 100 may also include relay stations. A relay station is a station that receives a transmission of data and/or other information from an upstream station (e.g., a BS 110 or a UE 120) and sends a transmission of the data and/or other information to a downstream station (e.g., a UE 120 or a BS 110). A relay station may also be a UE 120 that relays transmissions for other UEs 120. In the example shown in FIG. 1, a relay station 110r may communicate with the BS 110a and a UE 120r to facilitate communication between the BS 110a and the UE 120r. A relay station may also be referred to as a relay BS, a relay, etc.

The wireless communication network 100 may be a heterogeneous network that includes BSs 110 of different types, e.g., macro BS, pico BS, femto BS, relays, etc. These different types of BSs 110 may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

The wireless communication network 100 may support synchronous or asynchronous operation. For synchronous operation, the BSs 110 may have similar frame timing, and transmissions from different BSs 110 may be approximately aligned in time. For asynchronous operation, the BSs 110 may have different frame timing, and transmissions from different BSs 110 may not be aligned in time. The techniques described herein may be used for both synchronous and asynchronous operation.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE 120 may be stationary or mobile. A UE 120 may also be referred to as a mobile station, a terminal, an access terminal, a subscriber unit, a station, a customer premises equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, gaming device, reality augmentation device (augmented reality (AR), extended reality (XR), or virtual reality (VR)), or any other suitable device that is configured to communicate via a wireless or wired medium.

Some UEs 120 may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on a downlink (DL) and single-carrier frequency division multiplexing (SC-FDM) on an uplink (UL). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the UL and the DL and include support for half-duplex operation using TDD. Beamforming may be supported and beam direction may be dynamically configured. Multiple input multiple output (MIMO) transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some scenarios, air interface access may be scheduled. For example, a scheduling entity (e.g., a BS 110, Node B, eNB, gNB, or the like) can allocate resources for communication among some or all devices and equipment within its service area or cell. The scheduling entity may be responsible for scheduling, assigning, reconfiguring, and releasing resources for one or more subordinate entities. That is, for scheduled communication, subordinate entities can utilize resources allocated by one or more scheduling entities.

BSs 110 are not the only entities that may function as a scheduling entity. In some examples, a UE 120 may function as a scheduling entity and may schedule resources for one or more subordinate entities (e.g., one or more other UEs 120), and the other UEs 120 may utilize the resources scheduled by the UE 120 for wireless communication. In some examples, a UE 120 may function as a scheduling entity in a peer-to-peer (P2P) network, and/or in a mesh network. In a mesh network example, UEs 120 may communicate directly with one another in addition to communicating with a scheduling entity.

Turning back to FIG. 1, this figure illustrates a variety of potential deployments for various deployment scenarios. For example, in FIG. 1, a solid line with double arrows indicates desired transmissions between a UE 120 and a serving BS 110, which is a BS 110 designated to serve the UE 120 on the DL and/or the UL. A finely dashed line with double arrows indicates interfering transmissions between the UE 120 and the BS 110. Other lines show component to component (e.g., a UE to a UE) communication options.

Figure 2:
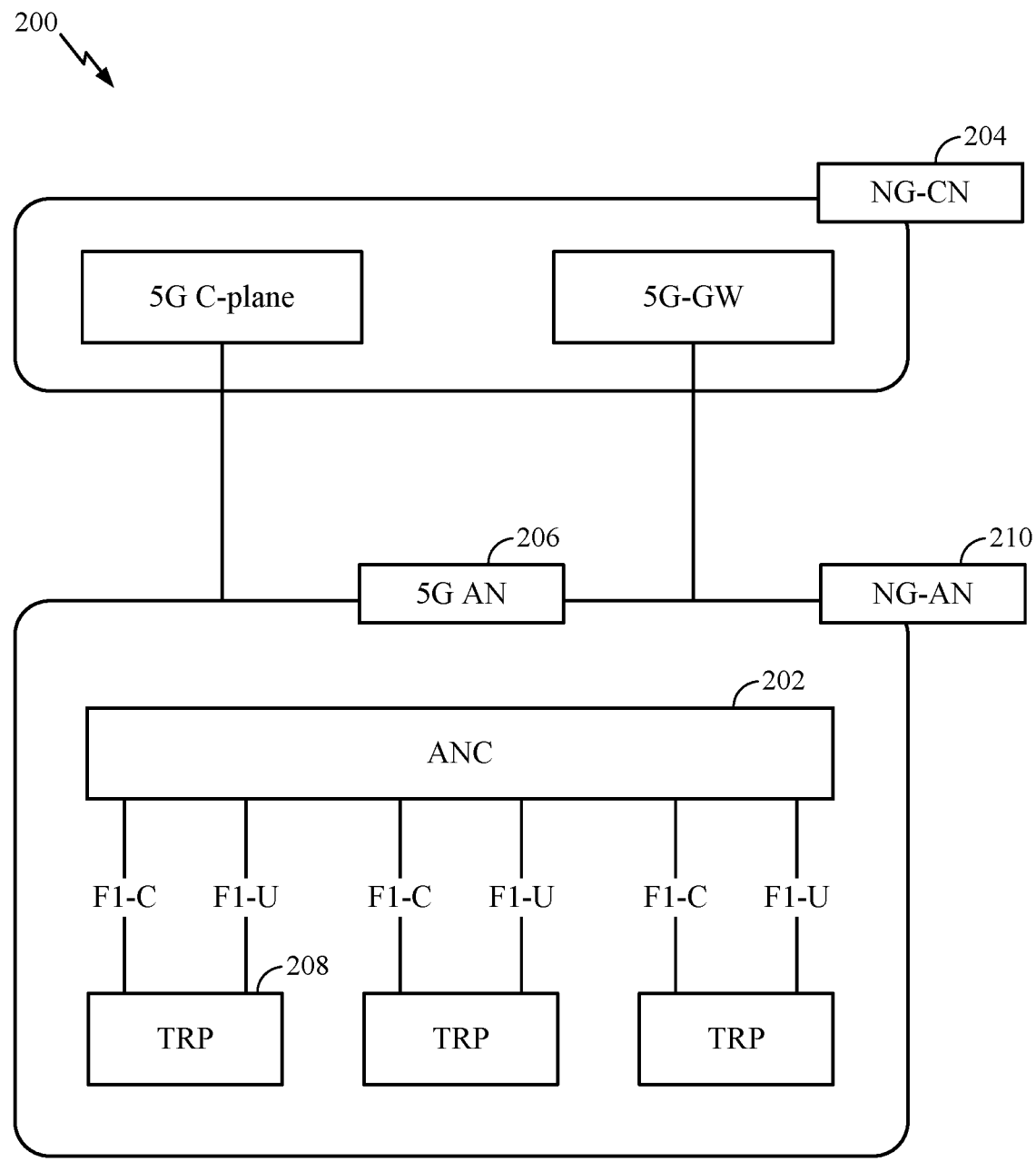
FIG. 2 is a block diagram illustrating an example logical architecture of a distributed radio access network (RAN), in accordance with certain aspects of the present disclosure.

FIG. 2 illustrates an example logical architecture of a distributed radio access network (RAN) 200, which may be implemented in the wireless communication network 100 illustrated in FIG. 1. A 5G access node 206 may include an access node controller (ANC) 202. The ANC 202 may be a central unit (CU) of the distributed RAN 200. A backhaul interface to the Next Generation Core Network (NG-CN) 204 may terminate at the ANC 202. The backhaul interface to neighboring next generation access Nodes (NG-ANs) 210 may terminate at the ANC 202. The ANC 202 may include one or more TRPs 208 (e.g., cells, BSs, gNBs, etc.).

The TRPs 208 may be a distributed unit (DU). The TRPs 208 may be connected to a single ANC (e.g., ANC 202) or more than one ANC (not illustrated). For example, for RAN sharing, radio as a service (RaaS), and service specific ANC deployments, the TRPs 208 may be connected to more than one ANC. The TRPs 208 may each include one or more antenna ports. The TRPs 208 may be configured to individually (e.g., dynamic selection) or jointly (e.g., joint transmission) serve traffic to a UE.

The logical architecture of the distributed RAN 200 may support various backhauling and fronthauling solutions. This support may occur via and across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of the distributed RAN 200 may enable cooperation between and among TRPs 208, for example, within a TRP and/or across TRPs via ANC 202. An inter-TRP interface may not be used.

Logical functions may be dynamically distributed in the logical architecture of the distributed RAN 200. As will be described in more detail with reference to FIG. 5, a radio resource control (RRC) layer, a packet data convergence protocol (PDCP) layer, a radio link control (RLC) layer, a medium access control (MAC) layer, and physical (PHY) layers may be adaptably placed at the DU (e.g., TRP 208) or CU (e.g., ANC 202).

Figure 3:
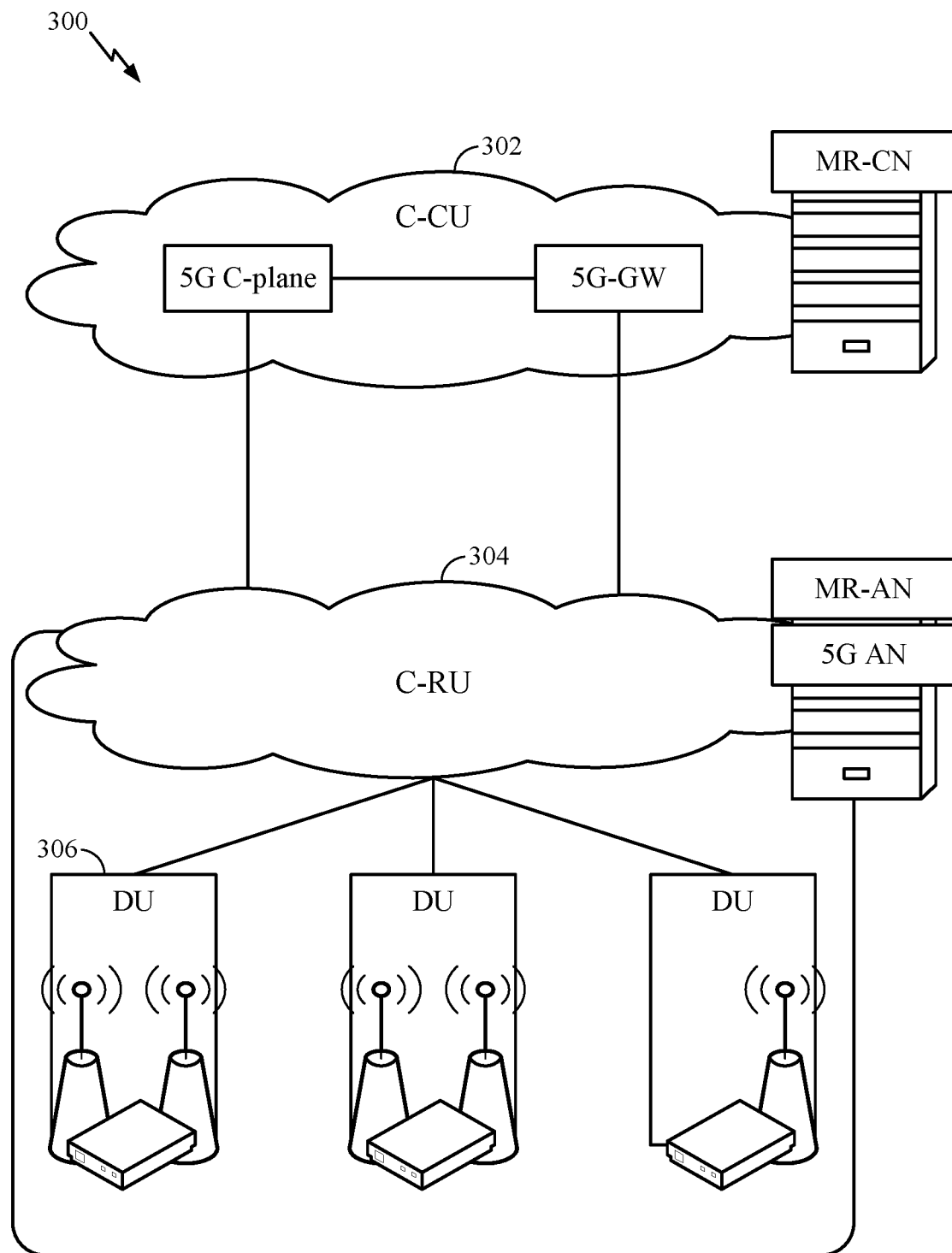
FIG. 3 is a diagram illustrating an example physical architecture of a distributed RAN, in accordance with certain aspects of the present disclosure.

FIG. 3 illustrates an example physical architecture of a distributed radio access network (RAN) 300, according to aspects of the present disclosure. A centralized core network unit (C-CU) 302 may host core network functions. The C-CU 302 may be centrally deployed. The C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (edge node (EN), an edge unit (EU), a radio head (RH), a smart radio head (SRH), or the like). The DU 306 may be located at edges of the network with radio frequency (RF) functionality.

Figure 4:
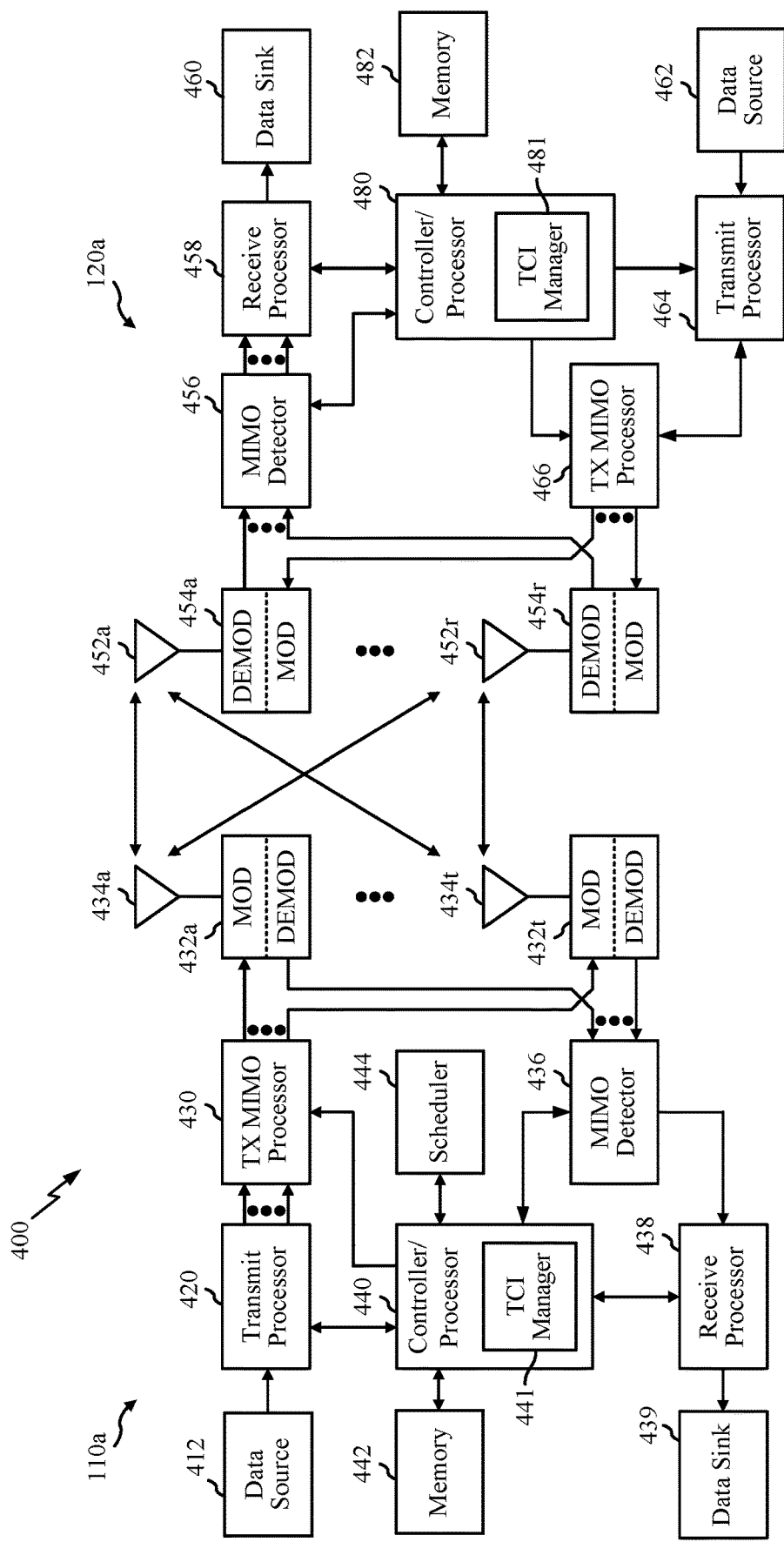
FIG. 4 is a block diagram conceptually illustrating a design of an example base station (BS) and user equipment (UE), in accordance with certain aspects of the present disclosure.

FIG. 4 illustrates example components of a BS 110a and a UE 120a (e.g., in the wireless communication network 100 of FIG. 1).

At the BS 110a, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The transmit processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit MIMO processor 430 may perform spatial processing (e.g., precoding) on the data symbols, the control symbols, and/or the reference symbols, if applicable, and may provide output symbol streams to modulators (MODs) in transceivers 432a through 432t. Each MOD in transceivers 432 may process a respective output symbol stream (e.g., for OFDM, etc.) to obtain an output sample stream. Each MOD in transceivers 432 may further process (e.g., convert to analog, amplify, filter, and upconvert) the output sample stream to obtain a DL signal. The DL signals from the MODs in transceivers 432a through 432t may be transmitted via antennas 434a through 434t, respectively.

At the UE 120a, antennas 452a through 452r may receive the DL signals from the BS 110 and may provide received signals to demodulators (DEMODs) in transceivers 454a through 454r, respectively. Each DEMOD in the transceiver 454 may condition (e.g., filter, amplify, down convert, and digitize) a respective received signal to obtain input samples. Each DEMOD in the transceiver 454 may further process input samples (e.g., for OFDM, etc.) to obtain received symbols. A MIMO detector 456 may obtain received symbols from all DEMODs in the transceivers 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the UL, at UE 120a, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a transmit MIMO processor 466 if applicable, further processed by the DEMODs in transceivers 454a through 454r (e.g., for SC-FDM, etc.), and transmitted to the BS 110. At the BS 110a, UL signals from the UE 120 may be received by the antennas 434, processed by the MOD in transceivers 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct operations at the BS 110a and the UE 120a, respectively. The processor 440 and/or other processors and modules at the BS 110a may perform or direct execution of processes for techniques described herein. The memories 442 and 482 may store data and program codes for the BS 110a and the UE 120a, respectively. A scheduler 444 may schedule UEs for data transmission on the DL and/or the UL.

Antennas 452, processors 466, 458, 464, and/or controller/processor 480 of the UE 120a and/or antennas 434, processors 420, 430, 438, and/or controller/processor 440 of the BS 110a may be used to perform various techniques and methods described herein. For example, as shown in FIG. 4, the controller/processor 440 of the BS 110a has a TCI manager 441 that may be configured to perform the operations illustrated in FIG. 12, as well as other operations disclosed herein. As shown in FIG. 4, the controller/processor 480 of the UE 120a has a TCI manager 481 that may be configured to perform the operations illustrated in FIG. 11, as well as other operations disclosed herein, in accordance with aspects of the present disclosure. Although shown at the controller/processor, other components of the UE 120a and the BS 110a may be used performing the operations described herein.

Figure 5:
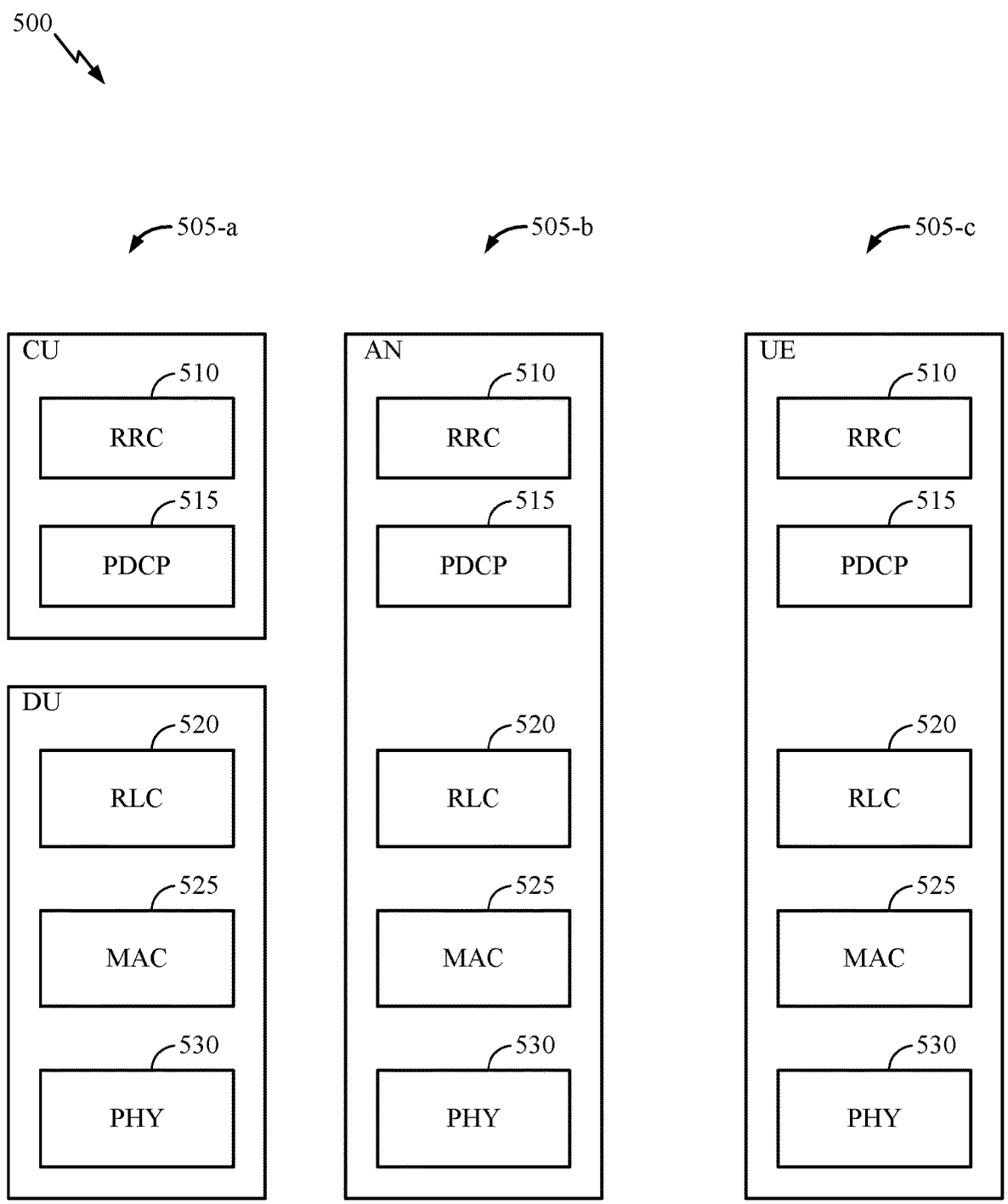
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). The diagram 500 illustrates a communications protocol stack including a radio resource control (RRC) layer 510, a packet data convergence protocol (PDCP) layer 515, a radio link control (RLC) layer 520, a medium access control (MAC) layer 525, and a physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the CU, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, the RRC layer 510, the PDCP layer 515, the RLC layer 520, the MAC layer 525, and the PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

Embodiments discussed herein may include a variety of spacing and timing deployments. For example, in LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, slots) depending on the subcarrier spacing. The NR RB is 12 consecutive frequency subcarriers. The NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
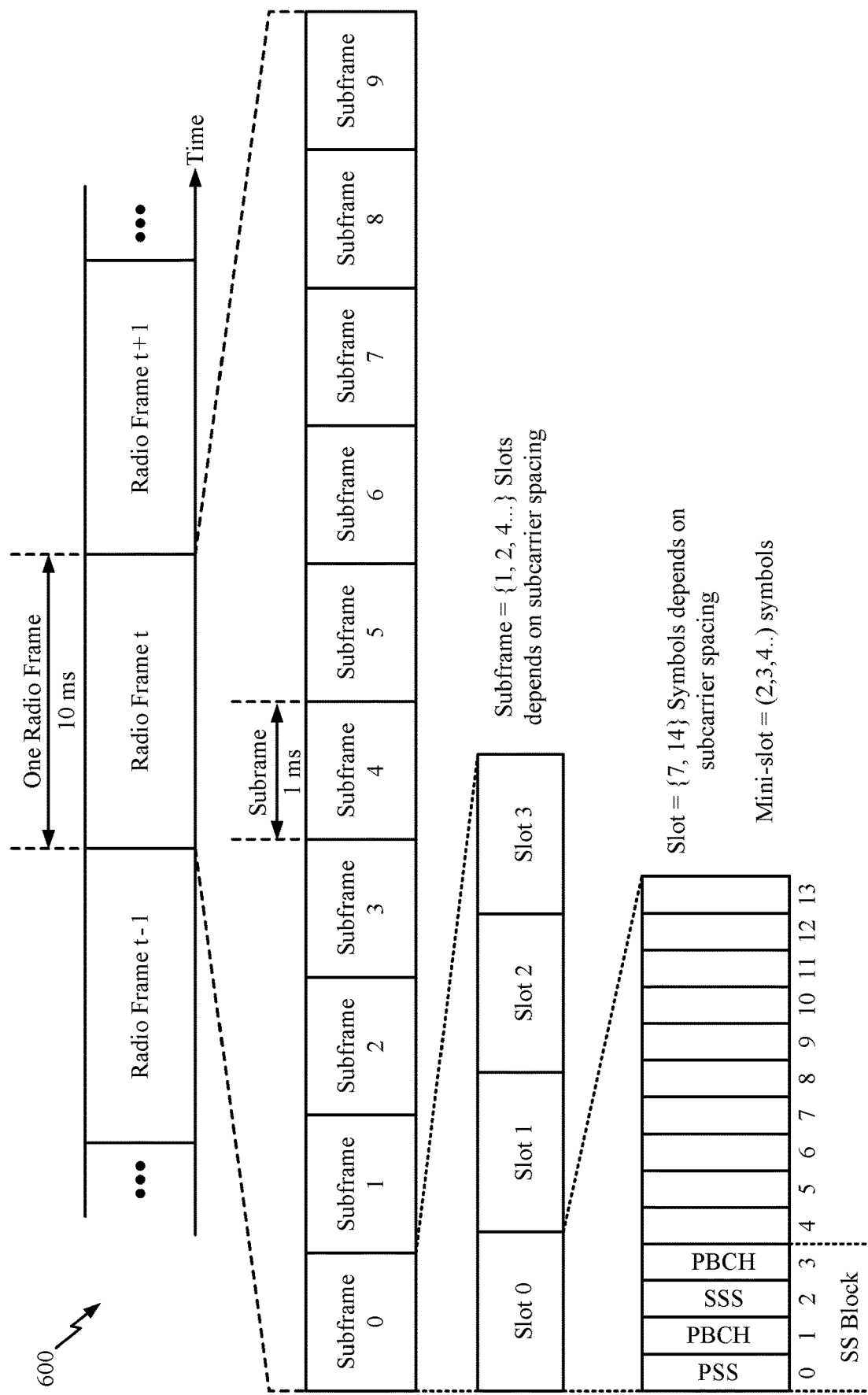
FIG. 6 illustrates an example of a frame format for a new radio (NR) system, in accordance with certain aspects of the present disclosure.

FIG. 6 is a diagram showing an example of a frame format 600 for NR. The transmission timeline for each of a DL and an UL may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A sub-slot structure may refer to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block (SSB) is transmitted. In certain aspects, SSBs may be transmitted in a burst where each SSB in the burst corresponds to a different beam direction for UE-side beam management (e.g., including beam selection and/or beam refinement). The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within radio frame, SS burst set periodicity, system frame number, etc.

Further system information such as, remaining minimum system information (RMSI), system information blocks (SIBs), other system information (OSI) can be transmitted on a PDSCH in certain subframes.

Figure 7:
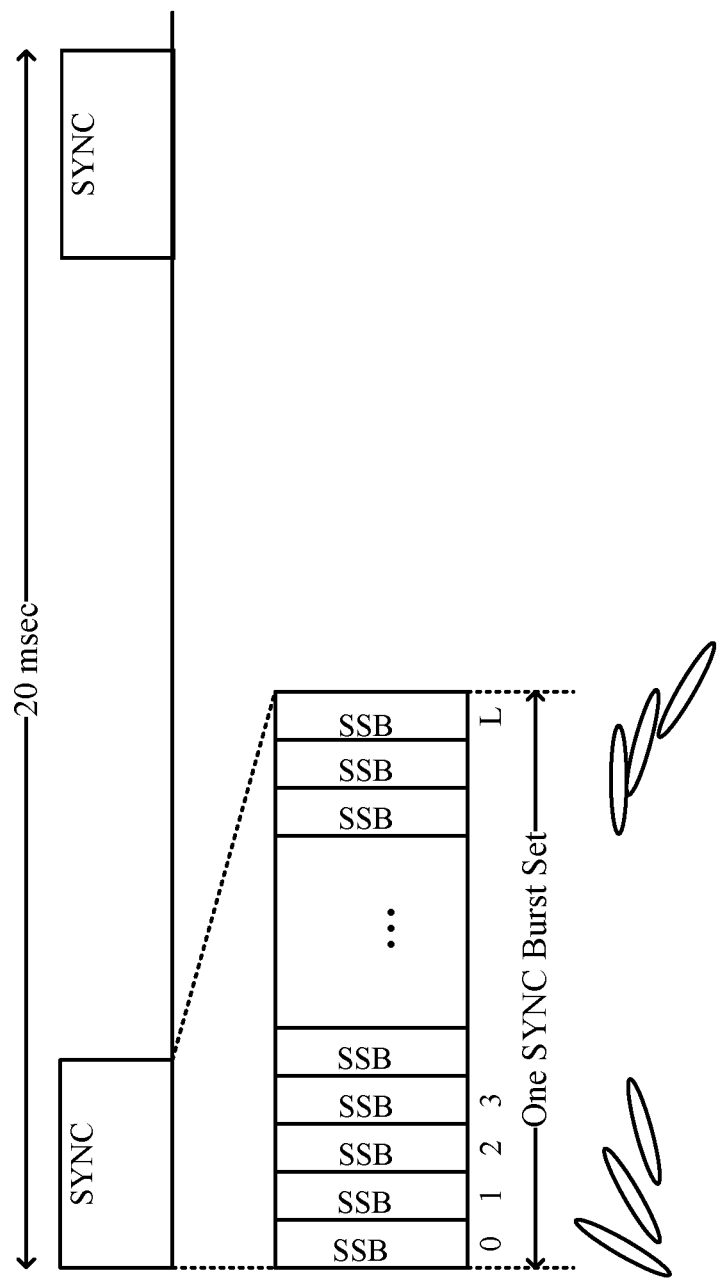
FIG. 7 illustrates how different synchronization signal blocks (SSBs) may be sent using different beams, in accordance with certain aspects of the present disclosure.

As shown in FIG. 7, the SSBs may be organized into SS burst sets to support beam sweeping. As shown, each SSB within a burst set may be transmitted using a different beam, which may help a UE quickly acquire both transmit (Tx) and receive (Rx) beams (particular for mmW applications). A physical cell identity (PCI) may still decoded from the PSS and SSS of the SSB.

Certain deployment scenarios may include one or both NR deployment options. Some may be configured for non-standalone (NSA) and/or standalone (SA) option. A SA cell may need to broadcast both SSB and RMSI, for example, with SIB1 and SIB2. A NSA cell may only need to broadcast SSB, without broadcasting RMSI. In a single carrier in NR, multiple SSBs may be sent in different frequencies, and may include the different types of SSB.

Control Resource Sets (CORESETs)

A control resource set (CORESET) for an orthogonal frequency division multiple access (OFDMA) system (e.g., a wireless communications system transmitting a physical downlink control channel (PDCCH) using OFDMA waveforms) may include one or more control resource (e.g., time and frequency resource) sets, which may be configured for conveying the PDCCH, within a system bandwidth. Within each CORESET, one or more search spaces (e.g., a common search space (CSS), a user equipment (UE)-specific search space (USS), etc.) may be defined for a given UE. The search spaces are areas or portions where a communication device (e.g., a UE) may look for control information.

According to aspects of the present disclosure, a CORESET is a set of time and frequency domain resources, defined in units of resource element groups (REGs). Each REG may include a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (new radio (NR)-PDCCHs), with different numbers of CCEs in the sets used to transmit NR-PDCCHs using differing aggregation levels.

Multiple sets of CCEs may be defined as search spaces for UEs. A NodeB or other base station (BS) may transmit an NR-PDCCH to a UE by transmitting the NR-PDCCH in a set of CCEs that is defined as a decoding candidate within a search space for the UE. The UE may receive the NR-PDCCH by searching in the search spaces for the UE and decoding the NR-PDCCH transmitted by the NodeB.

Operating characteristics of a NodeB or other BS in an NR communications system may be dependent on a frequency range (FR) in which the wireless communication system operates. A FR may include one or more operating bands (e.g., "n1" band, "n2" band, "n7" band, and "n41" band). The wireless communications system (e.g., one or more NodeBs and UEs) may operate in the one or more operating bands. The FRs and the operating bands are described in more detail in "Base Station (BS) radio transmission and reception" TS38.104 (Release 15), which is available from the 3GPP website.

As described above, a CORESET is a set of time and frequency domain resources. The CORESET can be configured for conveying PDCCH within a system bandwidth. A UE may determine the CORESET and monitors the CORESET for control channels. During initial access, the UE may identify an initial CORESET (CORESET #0) configuration from a field (e.g., pdcchConfigSIB1) in a master information block (MIB). The initial CORESET may then be used to configure the UE (e.g., with other CORESETs and/or bandwidth parts via dedicated (UE-specific) signaling. When the UE detects a control channel in the CORESET, the UE attempts to decode the control channel and communicates with a transmitting BS (e.g., a transmitting cell) according to control data provided in the control channel (e.g., transmitted via the CORESET).

According to aspects of the present disclosure, when a UE is connected to a cell (or a BS), the UE may receive a MIB. The MIB can be in a synchronization signal (SS) and physical broadcast channel (PBCH) block (e.g., in the PBCH of the SS/PBCH block) on a synchronization raster (e.g., a sync raster). In some scenarios, the sync raster may correspond to an SSB. From a frequency of the sync raster, the UE may determine an operating band of the cell. Based on the operation band of the cell, the UE may determine a minimum channel bandwidth and a subcarrier spacing (SCS) of a channel. The UE may then determine an index from the MIB (e.g., four bits in the MIB, conveying an index in a range 0-15).

Based on the determined index, a UE may look up or locate a CORESET configuration (e.g., an initial CORESET configured via the MIB and is referred to as CORESET #0). The UE may locate the CORSET configuration in one or more tables of CORESET configurations. The CORESET configurations (including single table scenarios) may include various subsets of indices indicating valid CORESET configurations for various combinations of a minimum channel bandwidth and a SCS. In some arrangements, each combination of the minimum channel bandwidth and the SCS may be mapped to a subset of indices in a table.

Alternatively or additionally, a UE may select a search space CORESET configuration table from several tables of CORESET configurations. The CORESET configurations can be based on a minimum channel bandwidth and a SCS. The UE may then look up a CORESET configuration (e.g., a Type0-PDCCH search space CORESET configuration) from the selected table, based on the index. After determining the CORESET configuration (e.g., from the single table or the selected table), the UE may then determine the CORESET to be monitored (as mentioned above) based on a location (in time and frequency) of a SS/PBCH block and the CORESET configuration.

Figure 8:
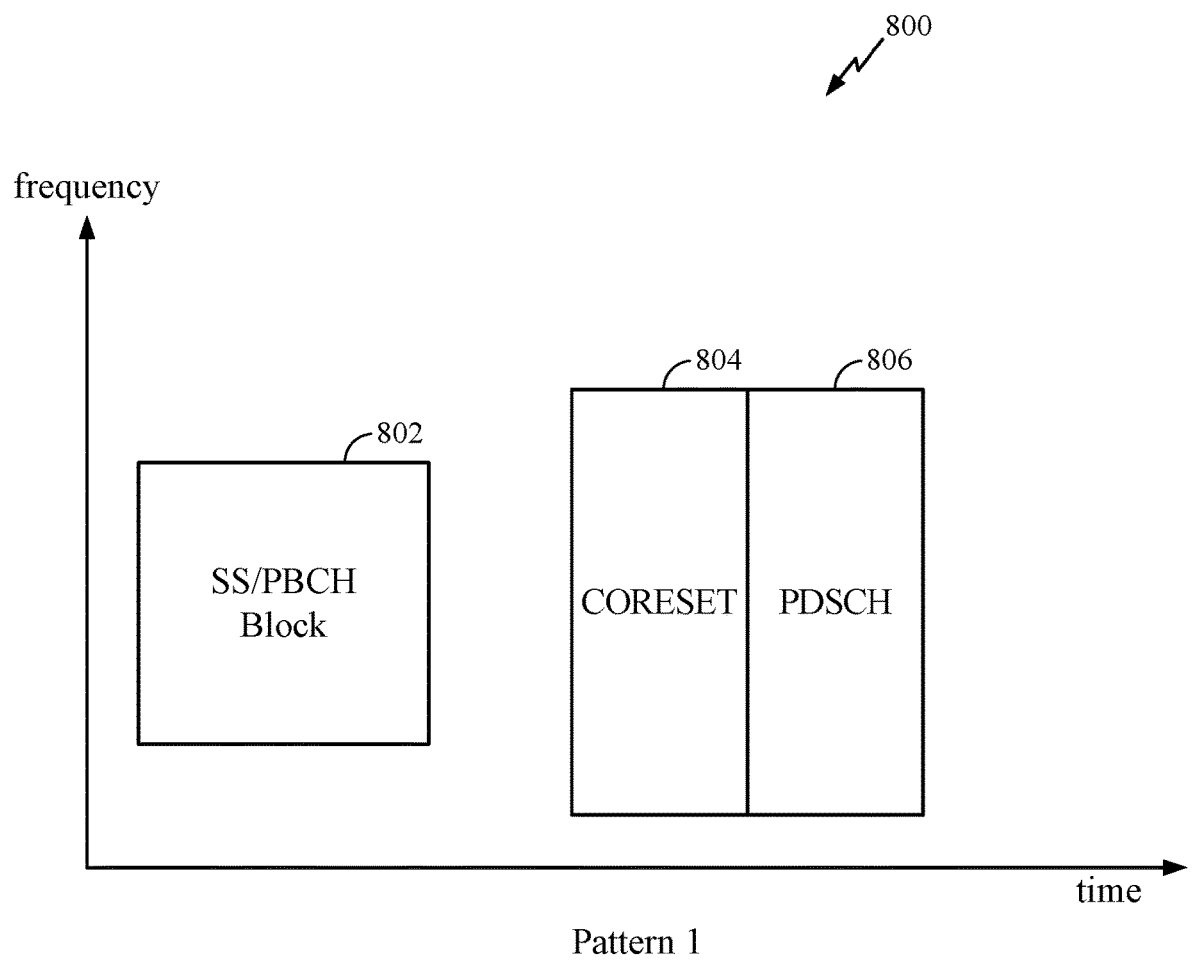
FIG. 8 shows an example transmission resource mapping, in accordance with certain aspects of the present disclosure.

FIG. 8 shows an example transmission resource mapping 800, according to aspects of the present disclosure.

A BS (e.g., such as the BS 110a in the wireless communication network of FIG. 1) transmits an SS/PBCH block 802. The SS/PBCH block includes a MIB conveying an index to a table that relates time and frequency resources of a CORESET 804 to time and frequency resources of the SS/PBCH block.

The BS may also transmit control signaling. In some scenarios, the BS may also transmit a PDCCH to a UE (e.g., such as the UE 120 in the wireless communication network of FIG. 1) in the (time/frequency resources of the) CORESET. The PDCCH may schedule a physical downlink shared channel (PDSCH) 806. The BS then transmits the PDSCH to the UE. The UE may receive the MIB in the SS/PBCH block, determine the index, look up a CORESET configuration based on the index, and determine the CORESET from the CORESET configuration and the SS/PBCH block. The UE may then monitor the CORESET, decode the PDCCH in the CORESET, and receive the PDSCH that was allocated by the PDCCH.

Different CORESET configurations may have different parameters that define a corresponding CORESET. For example, each CORESET configuration may indicate a number of resource blocks (RBs) (e.g., 24, 48, or 96), a number of symbols (e.g., 1-3), as well as an offset (e.g., 0-38 RBs) that indicates a location in a frequency.

QCL Port and TCI States

In many cases, it is important for a user equipment (UE) to know which assumptions the UE can make on a channel corresponding to different transmissions. For example, the UE may need to know which reference signals (RSs) the UE can use to estimate the channel in order to decode a transmitted signal (e.g., a physical downlink control channel (PDCCH) or a physical downlink shared channel (PDSCH)). It may also be important for the UE to be able to report relevant channel state information (CSI) to a base station (BS) for scheduling, link adaptation, and/or beam management purposes. In new radio (NR), a concept of quasi co-location (QCL) and transmission configuration indicator (TCI) states is used to convey information about these assumptions.

QCL assumptions are defined in terms of channel properties. Per 3GPP TS 38.214, "two antenna ports are said to be quasi-co-located if properties of the channel over which a symbol on one antenna port is conveyed can be inferred from the channel over which a symbol on the other antenna port is conveyed." Different RSs may be considered quasi co-located ("QCL'd") if a receiver (e.g., a UE) can apply the channel properties determined by detecting a first RS to help detect a second RS. TCI states include configurations such as QCL-relationships, for example, between a downlink (DL) RSs in one CSI-RS set and the PDSCH demodulation RS (DMRS) ports.

In some cases, a UE may be configured with up to M TCI-States. The UE may receive configuration of the M TCI-States via a higher layer signalling. The UE may be signalled to decode a PDSCH according to a detected PDCCH with a downlink control information (DCI) indicating one of the TCI states. Each configured TCI state may include one RS set TCI-RS-SetConfig that indicates different QCL assumptions between certain source and target signals.

Figure 9:
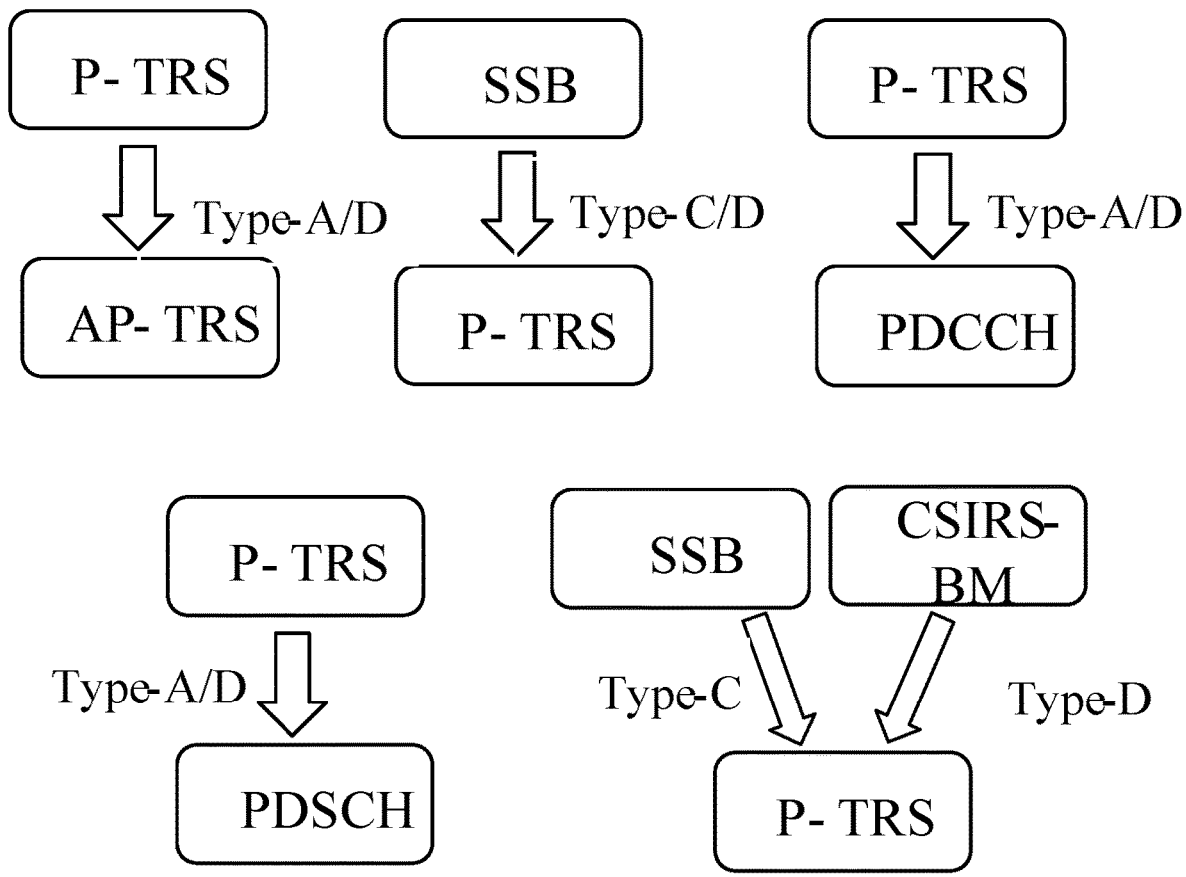
FIG. 9 illustrates example quasi co-location (QCL) relationships, in accordance with certain aspects of the present disclosure.

FIG. 9 illustrate examples of association of DL RSs with corresponding QCL types that may be indicated by a TCI-RS-SetConfig.

As shown, a source RS is indicated in a top block and is associated with a target signal indicated in a bottom block. In this context, the target signal refers to a signal for which channel properties may be inferred by measuring those channel properties for an associated source signal. As noted above, a UE may use the source RS to determine various channel parameters, depending on the associated QCL type, and use the various channel properties (determined based on the source RS) to process the target signal. A target RS does not necessarily need to be PDSCH's DMRS, rather the target RS can be any other RS: PUSCH DMRS, CSIRS, TRS, and SRS.

As illustrated, each TCI-RS-SetConfig contains parameters. The parameters can, for example, configure QCL relationship(s) between RSs in a RS set and a DMRS port group of the PDSCH. The RS set contains a reference to either one or two DL RSs and an associated QCL type for each one configured by a higher layer parameter QCL-Type.

As illustrated in FIG. 9, for a case of two DL RSs, QCL types can take on a variety of arrangements. For example, the QCL types may not be the same, regardless of whether the references are to the same DL RS or different DL RSs. In the illustrated example, a SSB is associated with a Type C QCL for P-TRS, while a CSI-RS for beam management (CSIRS-BM) is associated with a Type D QCL.

QCL information and/or types may in some scenarios depend on or be a function of other information. For example, the QCL types indicated to a UE can be based on a higher layer parameter QCL-Type and may take one or a combination of the following types:

QCL-TypeA: {Doppler shift, Doppler spread, average delay, delay spread},
QCL-TypeB: {Doppler shift, Doppler spread},
QCL-TypeC: {average delay, Doppler shift}, and
QCL-TypeD: {Spatial Rx parameter}, Spatial QCL assumptions (QCL-TypeD) may be used to help a UE to select an analog Rx beam (e.g., during beam management procedures). For example, an SSB resource indicator may indicate a same beam for a previous RS should be used for a sub sequent transmission.

A UE may identify an initial CORESET (e.g., CORESET ID 0 or simply CORESET #0) in a NR during initial access (e.g., via a field in a master information block (MIB)). A ControlResourceSet information element (CORESET IE) sent via radio resource control (RRC) signaling may convey information regarding a CORESET configured for a UE. The CORESET IE includes a CORESET ID, an indication of frequency domain resources (e.g., a number of resource blocks (RBs)) assigned to the CORESET, contiguous time duration of the CORESET in a number of symbols, and TCI states.

As noted above, a subset of the TCI states may provide QCL relationships between DL RS(s) in one RS set (e.g., TCI-Set) and PDCCH DMRS ports. A particular TCI state for a given UE (e.g., for a unicast PDCCH) may be conveyed to the UE by a medium access control (MAC) control element (MAC-CE). The particular TCI state is selected from the set of TCI states conveyed by a CORESET IE, with an initial CORESET (CORESET #0) configured via a MIB.

Search space information may also be provided via RRC signaling. For example, a SearchSpace IE is another RRC IE that defines how and where to search for PDCCH candidates for a given CORESET. Each search space is associated with one CORESET. The SearchSpace IE identifies a search space configured for a CORESET by a search space ID. In an aspect, the search space ID associated with CORESET #0 is SearchSpace ID #0. The search space is configured via a PBCH (a MIB).

Example Dynamic CORESETs

Aspects of the present disclosure provide apparatus, methods, processing systems, and computer readable mediums for processing and signaling dynamic control channel resources. As will be described, techniques presented herein may allow for the use of more sparse "regular" periodic control channel resources, allowing a user equipment (UE) to conserve power by staying in a low power state longer (e.g., unless the dynamic control channel resources are indicated in regular control channel resources).

The techniques presented herein may be applied in various bands utilized for new radio (NR). For example, for a higher band referred to as FR4 (e.g., 52.6 GHz-114.25 GHz), an orthogonal frequency division multiple access (OFDM) waveform with a large subcarrier spacing (SCS) (e.g., 960 kHz-3.84 MHz) is required to combat severe phase noise. Due to the large SCS, a slot length tends to be very short. In a lower band referred to as FR2 (24.25 GHz to 52.6 GHz) with 120 kHz SCS, the slot length is 125 μSec, while in FR4 with 960 kHz, the slot length is 15.6 μSec. As a result, even with same-slot scheduling, FR2 may enjoy a power saving benefit of a micro-sleep. However, in FR4, control channel processing may overrun a slot length and micro-sleep may not be eligible.

In FR2, a UE may be configured to monitor a physical downlink control channel (PDCCH) in every slot. However, in FR4, due to limited processing capability and shorter slot length, the minimum PDCCH monitoring periodicity may need to be greater than one slot.

In certain applications, a UE may support a limited number of NR features (referred to as NR Light or NR Lite), for example, to keep costs low. Due to limited device capability in such applications, the UE may not be able to monitor a PDCCH in every slot.

In FR4 or NR Lite applications, control channel resource can be sparsely configured (e.g., occurring with a relatively low periodicity). Sparse control channel resource monitoring by the UE may alleviate the above noted issues and provides a power saving gain. For example, a PDCCH monitoring periodicity (e.g., by a search space periodicity configuration in a NR) can be very large (e.g., >>1 slots) in FR4.

Unfortunately, sparse control channel resources may limit scheduling flexibility and increase latency. Dynamic configuration and indication of additional control channel resource may avoid drawbacks of sparse control channel resources. In some cases, a network entity (e.g., a gNB) may dynamically indicate additional control channel resources in certain conditions, for example, to accommodate an increase (burst) of traffic targeting a particular UE.

Figure 10:
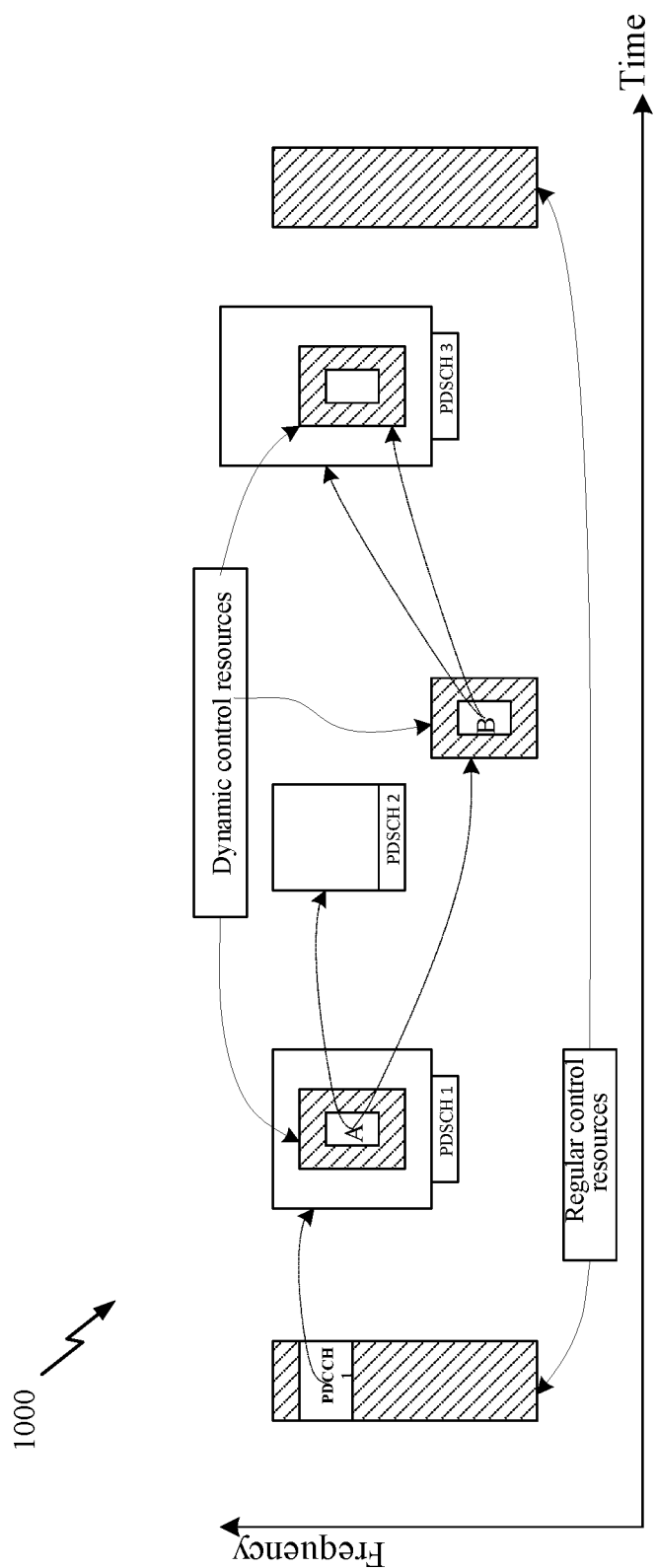
FIG. 10 illustrates an example timing diagram for dynamic control resource signaling, in accordance with certain aspects of the present disclosure.

As illustrated in FIG. 10, control channel resources may be indicated by dynamic signaling, for example, via a PDCCH in regular (sparse/periodic) control channel resources carrying downlink control information (DCI) or layer 1 (L1) signaling. Unlike the regular control channel resources, the dynamic control channel resources are non-recurring (aperiodic) and may be for one-shot (or a limited number of) monitoring occasions.

In some cases, a network entity may configure a UE with different options for sets of dynamic control channel resources. Based on the configuration and an indication, the UE can monitor PDCCHs within the dynamic control channel resources.

The dynamic control channel resources provided between sparse regular control channel monitoring occasions provides additional opportunities for control channel transmissions. The dynamic resources may be nested within resources for a physical downlink shared channel (PDSCH) scheduled by the PDCCH. As will be described below, in some cases, the dynamic control channel resources may be offset in a frequency from the scheduled PDSCH to avoid a collision.

As illustrated, in some cases, a PDCCH/DCI sent in dynamic control signal resources may indicate still additional dynamic control channel resources (creating a chain). In some cases, if the chain expands beyond a regular control channel resource, the UE may skip monitoring the regular control channel resource.

There are various options for how dynamic control channel resources may be triggered. For example, in some cases, one or more sets of the dynamic control channel resources may be indicated simultaneously. For example, a network entity may use a PDCCH for signaling the dynamic control channel resources. As illustrated, the network entity may transmit the PDCCH either in the regular control channel resources or in other dynamic control channel resources.

In some cases, the PDCCH may be a UE-specific PDCCH for downlink (DL)/uplink (UL) scheduling and/or a non-scheduling group-common PDCCH (e.g., with no grant). In some cases, the PDCCH may carry a DCI that may have an additional field or fields for indicating the dynamic control channel resources that may be added in the DCI. In other cases, a single field in the DCI may trigger multiple sets of dynamic control channel resources jointly. In other cases, multiple separate fields may be used, each triggering a different set.

In some cases, a network entity may configure a UE with a list of one or more sets of dynamic control channel resources (e.g., by RRC signaling). In such cases, a triggering field in a DCI may include an index in the list.

In such cases, the configuration may include various parameters, such as: time/frequency resources, a resource mapping type (e.g., interleaved or localized), precoding, a beam (e.g., quasi colocation (QCL)/transmission configuration indicator (TCI) state), an aggregation level, and/or a number of PDCCH candidates.

For joint triggering of multiple dynamic control channel resource sets, a combination of more than one set of dynamic control channel resources can be associated with a single entry in the list.

In some cases, instead of pre-configuration, some parameters related to the dynamic control channel resources may be determined at a moment of triggering. For example, when the dynamic control channel resources are triggered by a DL scheduling DCI, a TCI state for the dynamic control channel resources may be determined by the TCI state of a scheduled PDSCH (which may be particularly appropriate when there is an overlap of the dynamic control channel resources).

Alternatively, at least one of regular control channel resources can be indicated to a UE and the UE may determine dynamic control channel resources based on this regular configuration. In such cases, a same resource configuration as the regular control channel resources may be applied to the dynamic control channel resources with some modification. For example, a periodicity configuration of the regular control channel resources may be ignored and timing may be determined by an offset relative to a triggering DCI. As noted above, in some cases, a frequency shift (e.g., relative to a co-scheduled PDSCH) may be applied to avoid resource collision. In some cases, the dynamic indication may indicate the UE to skip (avoid monitoring for PDCCH in) one or more regular control channel resources.

Dynamic Indication of TCI/QCL for Dynamic CORESETs

As noted above, certain assumptions, such as quasi co-location (QCL) assumptions, may assist a user equipment (UE) to process downlink (DL) transmissions. Aspects of the present disclosure provide techniques for determining the QCL assumptions (relationships) for dynamic control resource sets (CORESETs), for example, based on QCL relationships and transmission configuration indicator (TCI) states.

One technique to determine QCL/TCI for dynamic CORESETs may be based on a similar mechanism as used for QCL/TCI state determination for regular CORESETs. One advantage to this technique is that it may leverage known specifications that may help facilitate implementations.

According to another technique, if a physical downlink shared channel (PDSCH) and dynamic CORESETs are co-scheduled (e.g., by a same downlink control information (DCI)), the dynamic CORESETs may reuse a same TCI state indication as used for the (co-scheduled) PDSCH. This technique may have an advantage of maybe using a refined beam for the dynamic CORESETs. In some cases, a combination of two or more of these various techniques may be used.

In some cases, TCI states for dynamic CORESETs may be dynamically indicated, for example, similar to how TCI states may be dynamically indicated for a PDSCH, but separate. This technique may have an advantage in terms of flexibility and may allow for refined beams.

In current new radio (NR) systems, a UE can be configured with a list of up to M TCI-State configurations (where M depends on a UE capability indicated by a parameter such as maxNumberConfiguredTCIstatesPerCC). The UE receives a medium access control-control element (MAC-CE) activation command to map up to 8 TCI states to code points of a TCI field in a DCI in one or more component carriers (CCs)/DL bandwidth parts (BWPs). The mapping between TCI states and code points of the DCI TCI field is applied starting from a first slot after slot $n+3N_{slot}^{subframe,\mu}$. The UE transmits a physical uplink control channel (PUCCH) with hybrid automatic repeat request (HARQ)-acknowledge (ACK) information in a slot n corresponding to a PDSCH carrying an activation command. μ may be a subcarrier spacing (SCS) configuration for the PUCCH. Different rules may exist depending on a time offset between the DCI (that schedules the PDSCH) and the PDSCH compared to a period timeDurationForQCL that is a reported UE capability. A parameter timeDurationForQCL represents a minimum time the UE is able to apply a TCI state from the time it is indicated to the UE.

Figure 11:
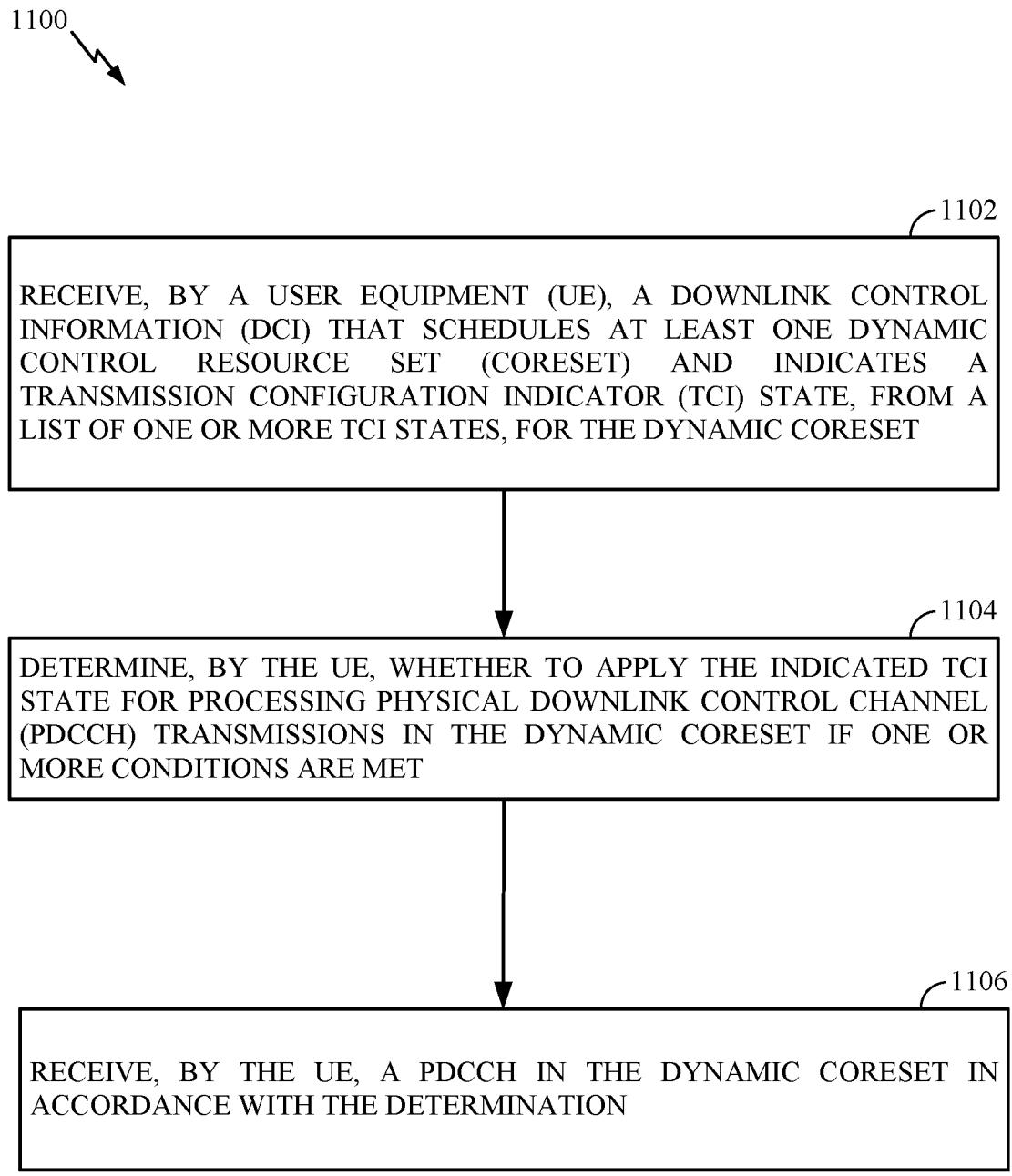
FIG. 11 illustrates example operations for wireless communications by a UE, in accordance with certain aspects of the present disclosure.

FIG. 11 is a flow diagram illustrating example operations 1100 for wireless communications, in accordance with certain aspects of the present disclosure. The operations 1100 may be performed, for example, by a UE (e.g., such as the UE 120a in the wireless communication network 100) to determine QCL assumptions for dynamic CORESETs. The operations 1100 may be implemented as software components that are executed and run on one or more processors (e.g., the controller/processor 480 of FIG. 4). Further, the transmission and reception of signals by the UE in operations 1100 may be enabled, for example, by one or more antennas (e.g., the antennas 452 of FIG. 4). In certain aspects, the transmission and/or reception of signals by the UE may be implemented via a bus interface of one or more processors (e.g., the controller/processor 480) obtaining and/or outputting signals.

The operations 1100 begin, at 1102, by receiving a DCI that schedules at least one dynamic CORESET and indicates a TCI state from a list of one or more TCI states for the dynamic CORESET. For example, referring back to FIG. 10, a PDCCH1 in a regular CORESET carries the DCI that schedules the dynamic CORESET and indicates the TCI state for the dynamic CORESET.

At 1104, the UE determines whether to apply the indicated TCI state for processing PDCCH transmissions in the dynamic CORESET if one or more conditions are met. For example, the UE applies the indicated TCI state if there is sufficient time from the scheduling DCI to the dynamic CORESET (e.g., providing the sufficient time for the UE to update beam settings according to the TCI state-assuming QCL Type D spatial information).

At 1106, the UE receives a PDCCH in the dynamic CORESET in accordance with the determination. In some cases, the UE monitors the dynamic CORESET for the PDCCH using a receive beam corresponding to a beam indicated in the TCI state.

Figure 12:
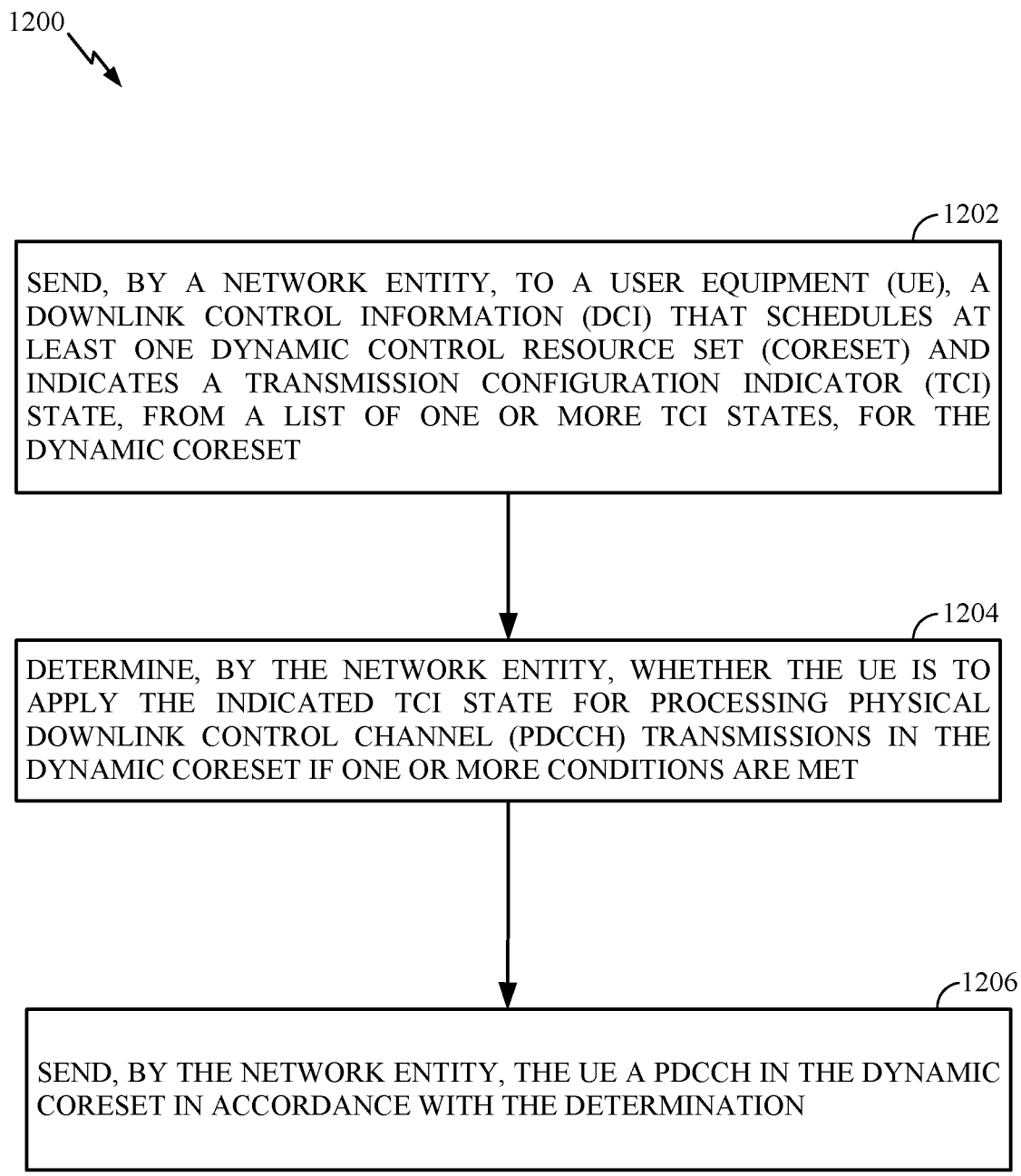
FIG. 12 illustrates example operations for wireless communications by a network entity, in accordance with certain aspects of the present disclosure.

FIG. 12 is a flow diagram illustrating example operations 1200 that may be considered complementary to operations 1100 of FIG. 11. For example, the operations 1200 may be performed by a network entity (e.g., such as the BS 110a in the wireless communication network 100). The operations 1200 may be implemented as software components that are executed and run on one or more processors (e.g., the controller/processor 440 of FIG. 4). Further, the transmission and reception of signals by the BS in operations 1200 may be enabled, for example, by one or more antennas (e.g., the antennas 434 of FIG. 4). In certain aspects, the transmission and/or reception of signals by the BS may be implemented via a bus interface of one or more processors (e.g., the controller/processor 440) obtaining and/or outputting signals.

The operations 1200 begin, at 1202, by sending, to a UE, a DCI that schedules at least one dynamic CORESET and indicates a TCI state from a list of one or more TCI states for the dynamic CORESET. For example, referring back to FIG. 10, the network entity sends a PDCCH1 in a regular CORESET that carries the DCI that schedules the dynamic CORESET and indicates the TCI state for the dynamic CORESET.

At 1204, the network entity determines whether the UE is to apply the indicated TCI state for processing PDCCH transmissions in the dynamic CORESET if one or more conditions are met. For example, the network entity determines whether or not the UE has sufficient time from the scheduling DCI to the dynamic CORESET.

At 1206, the network entity sends the UE a PDCCH in the dynamic CORESET in accordance with the determination (e.g., using a transmit beam corresponding to the indicated TCI state).

In some cases, one or more conditions for a UE to apply a TCI indicated in a DCI may involve a 'timeDuration-ForQCL' parameter value as described above. According to one option, the UE may reuse an existing parameter time-DurationForQCL parameter (used for a PDSCH). In some cases, however, the UE may need to apply scaling rules, for example, if a SCS of a PDCCH of a dynamic CORESET is different from the PDSCH. According to another option, a separate capability parameter may be defined for the dynamic CORESET (e.g., the UE may report separate timeDurationForQCL values for the PDSCH and the dynamic CORESET).

In some cases, a network entity may indicate in a radio resource control (RRC) message (e.g., via a CORESET configuration) whether a TCI field is present in a DCI scheduling a dynamic CORESET. According to one option, the network entity may reuse an existing tci-PresentInDCI parameter and/or a tci-PresentInDCI-ForFormat1_2 parameter (i.e., an existing field is reused for the dynamic CORESET). According to another option, one or more new separate fields and/or information elements (IEs) may be defined specifically for the dynamic CORESET.

In some cases, a dynamic CORESET TCI may reuse a TCI field for a PDSCH in a DCI scheduling a dynamic CORESET (although this option may only be applicable if the PDSCH is also scheduled in the same DCI). According to another option, a separate TCI field or IE may be defined specifically for the dynamic CORESET.

In some cases, a TCI field for a dynamic CORESET may be included in a separate DCI, such as an uplink (UL) DCI (i.e., DCI formats 0_x). For example, the dynamic CORESET may be scheduled using an UL grant DCI that includes the TCI field for the scheduled dynamic CORESET.

In some cases, a TCI state list (such as a list of one or more TCI states) for a dynamic CORESET may be configured according to different options. According to a first option, the TCI state list may be configured separately for the dynamic CORESET from the "tci-StatesPDCCH-ToAddList" in the ControlResourceSet IE corresponding to the dynamic CORESET, size of "tci-StatesPDCCH-ToAddList"=M According to a second option, the same configured TCI states for a PDSCH may be reused for the dynamic CORESET.

In some cases, up to N TCI states (N=TBD) may be mapped to code points of a DCI TCI field for a dynamic CORESET. When there may be separate TCI states for the dynamic CORESET, one option is to limit a size of "tci-StatesPDCCH-ToAddList" to N, for example, with this mapping done in a RRC. Another option is, if N<M, rules may be defined on which the N TCI states should be selected (e.g., how to select N TCI states for the dynamic CORESET from M signalled TCI states). In this case, the mapping and rules may be conveyed via the RRC.

In some cases, a network entity may send a medium access control (MAC) control element (CE) activation command to a UE to map up to N TCI states (out of M signalled states) to code points of a DCI TCI field. In one example, the network entity may send a small MAC-CE for activation (for timing to when the UE is able to apply the new TCI states and not for selection). In another example, the network entity may send the small MAC-CE that contains a serving cell ID, a CORESET ID and 1-bit for activation/deactivation. The small MAC-CE may use a new MAC header logical channel ID (LCD).

In some cases, a UE may receive an activation command from a network entity to map up to N TCI states (out of M signalled states) to code points of a TCI field in a DCI message. In such cases, the UE may send an acknowledgment (ACK) for the activating DCI and a timing for when the UE is able to apply the new TCI states may start from the ACK for the activating DCI.

In some cases, a dynamic CORESET may reuse a same activated TCI states as a PDSCH. In such cases, a down-selection of the TCI states for the dynamic CORESET (e.g., from M to N) can be done via a DCI or a MAC-CE.

In some cases, a timing for when a UE may be able to apply a dynamically indicated TCI may be determined by various parameters, such as TQCL (timeDurationForQCL, shared with a PDSCH or a separate parameter) and/or a parameter indicating TCI is present in a DCI (TCIinDCI=tci-PresentInDCI or tci-PresentInDCI-ForFormat1_2 or a separate parameter as described above). In some cases, if a time offset between a DCI and a dynamic CORESET is greater than or equal to the TQCL and if the dynamic CORESET is scheduled by the DCI having a TCI field present, then a PDCCH demodulation reference signal (DMRS) port for the dynamic CORESET may be assumed to be QCL'ed with the RS(s) in the TCI state given by the indicated TCI.

Figure 13:
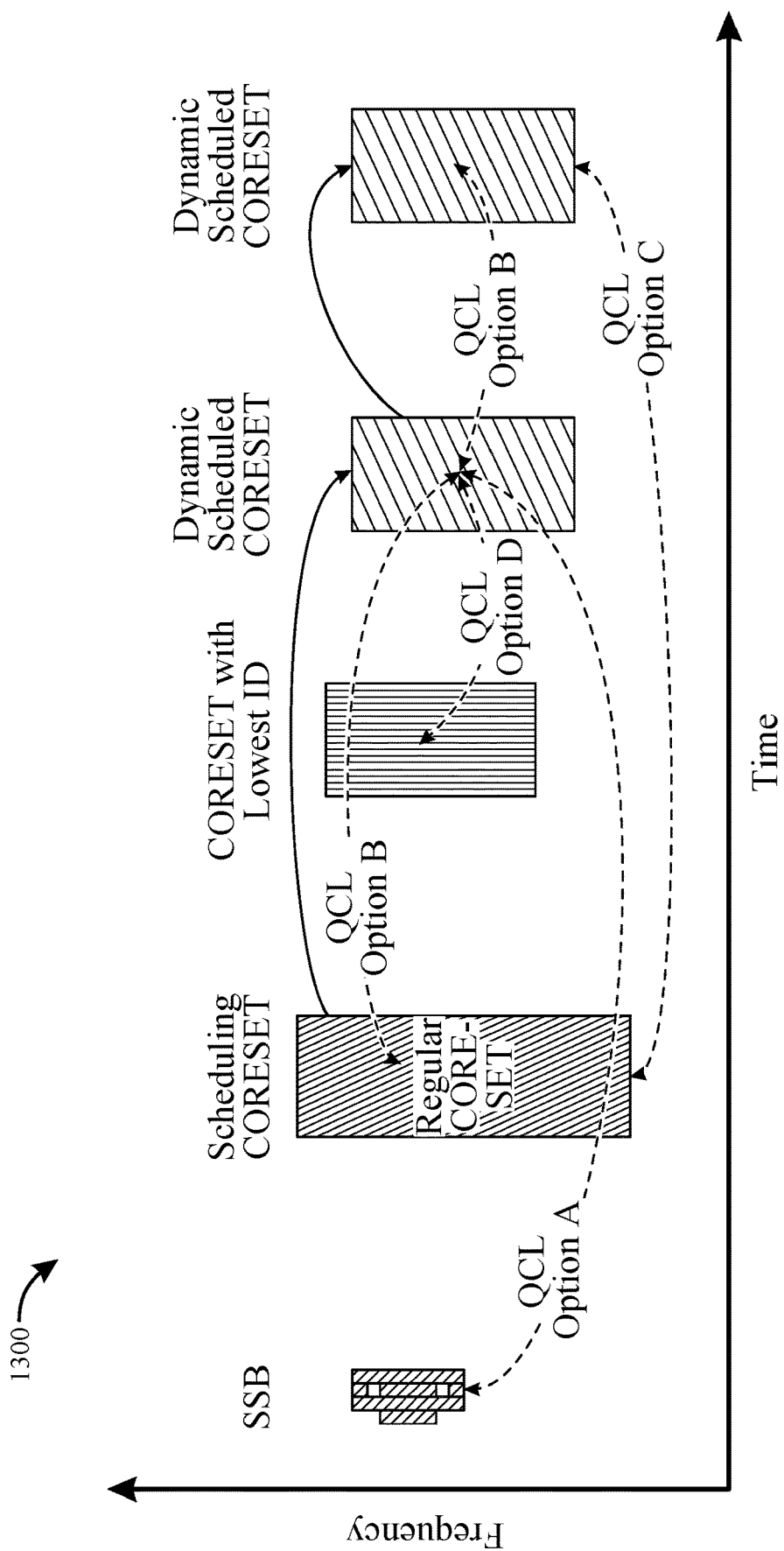
FIGS. 13-14 illustrate example timing diagrams for dynamic control resource signaling, in accordance with certain aspects of the present disclosure.

In some cases, a TCI may not be enabled/configured in a DCI, the DCI scheduling a dynamic CORESET may come before a reception of an activation command for a PDSCH TCI, the dynamic CORESET may be scheduled by the DCI that does not have a TCI field present, or a UE may not have a sufficient time to apply a TCI state indicated in the DCI (e.g., if a time offset between the DCI and the dynamic CORESET is less than timeDurationForQCL). In such cases, a QCL assumption for the dynamic CORESET is determined according to various options. The various options may be understood with reference to FIG. 13.

In a first option (such as "Option A" in FIG. 13), a PDCCH DMRS for the dynamic CORESET may be QCL'ed with a synchronization signal block (SSB) that the UE identified during an initial access procedure. For example, the UE may monitor the dynamic CORESET with a same receive beam corresponding to the SSB.

In a second option (such as "Option B" in FIG. 13), the PDCCH DMRS for the dynamic CORESET may be QCL'ed with a PDCCH DMRS for a scheduling CORESET (regardless if dynamic or regular). In other words, if the regular CORESET schedules the dynamic CORESET, the PDCCH DMRS for the dynamic CORESET is QCL'ed with the PDCCH DMRS for the regular CORESET. If another dynamic CORESET schedules the dynamic CORESET, the PDCCH DMRS for the scheduled dynamic CORESET is QCL'ed with the PDCCH DMRS for the scheduling dynamic CORESET.

In a third option (such as "Option C" in FIG. 13), the PDCCH DMRS for the dynamic CORESET is QCL'ed with a PDCCH DMRS for an original scheduling CORESET (e.g., only if the scheduling CORESET is the regular CORESET).

In a fourth option (such as "Option D" in FIG. 13), the PDCCH DMRS for the dynamic CORESET is QCL'ed with a PDCCH DMRS for a CORESET with a lowest controlResourceSetId in a latest slot. In this case, the CORESET can be dynamic or regular. The lowest ID could be for dynamic CORESETs only, regular CORESETs only, or both.

In some cases, one of multiple options (e.g., one of the four options A-D described above), may be signaled or specified to the UE.

In some cases, if a TCI is not enabled/configured in a DCI, the DCI comes before a reception of an activation command for a PDSCH TCI, the DCI does not have a TCI field present, or a UE may not have a sufficient time to apply a TCI state indicated in the DCI (e.g., if a time offset between the DCI and a dynamic CORESET is less than timeDurationForQCL, then, if the dynamic CORESET slot is greater than or equal to $3N_{slot}^{subframe,\mu}$ from a HARQ-ACK of a MAC-CE activation for a scheduling CORESET (regardless if the CORESET is dynamic or regular), then a PDCCH DMRS for the dynamic CORESET may be QCL'ed with the one or more DL RSs configured by a latest TCI state for the scheduling CORESET.

Figure 14:
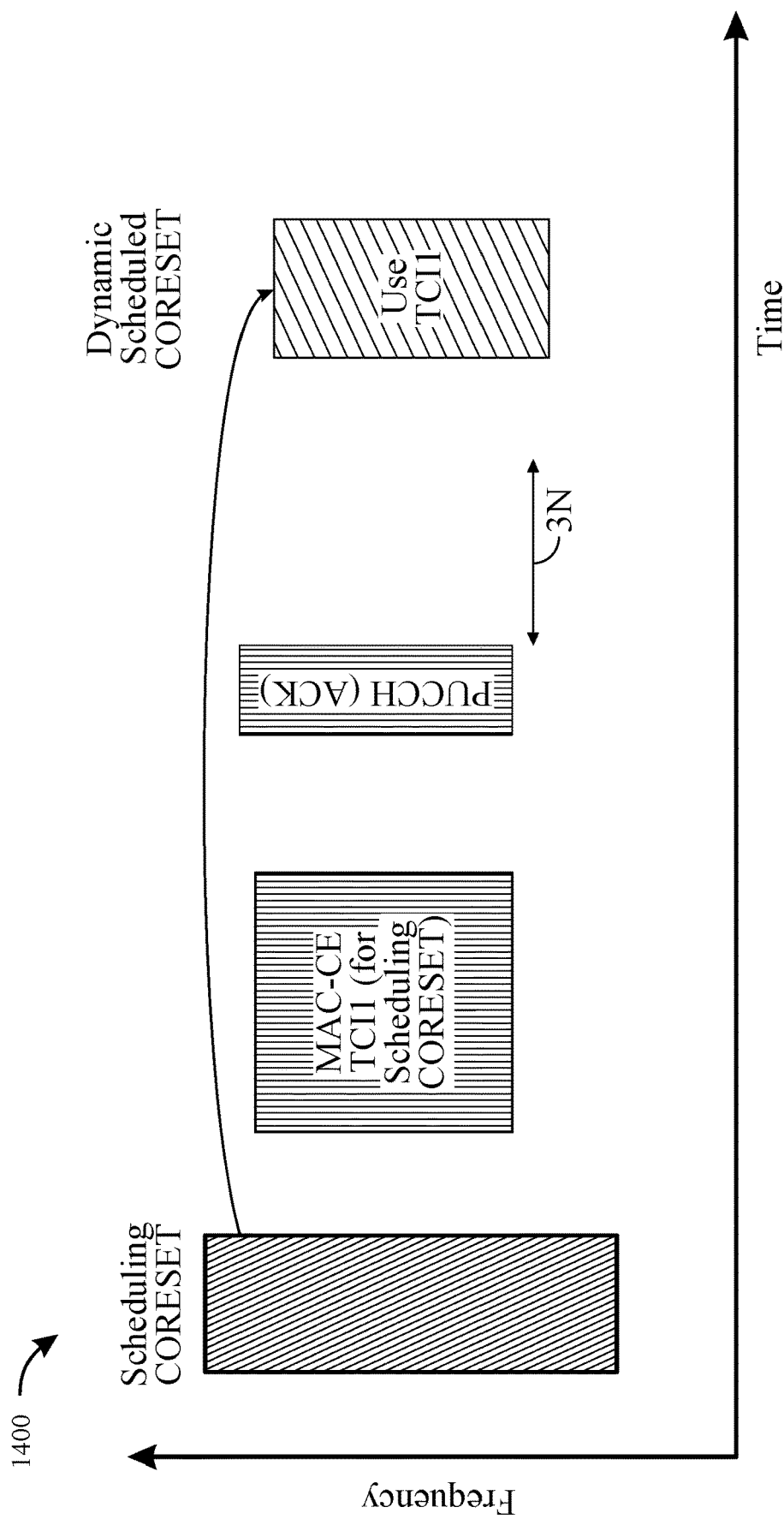

For example, as illustrated in FIG. 14, the UE may assume that the PDCCH DMRS for the dynamic CORESET may be QCL'ed with the one or more DL RSs configured by the latest TCI state for the scheduling CORESET if the dynamic CORESET is in a slot that is $3N_{slot}^{subframe,\mu}$ from the HARQ-ACK of the MAC-CE activation for the scheduling CORESET (regardless of whether the scheduling CORESET is dynamic or regular).

In some cases, a DCI (scheduling a dynamic CORESET) received on one CC may schedule a dynamic CORESET on another CC. In such cases, a parameter such as timeDurationForQCL may be determined based on a SCS of the dynamic CORESET ($\mu_{dynamic\_PDCCH}$) relative to a SCS of a scheduling CORESET ($\mu_{PDCCH}$). For example, if $\mu_{PDCCH}$ is less than $\mu_{dynamic\_PBCCH}$, an additional timing delay d may be added to the timeDurationForQCL.

In some cases, a DCI (scheduling a dynamic CORESET) received on one CC may schedule a dynamic CORESET on another CC. In such cases, if a TCI in co-scheduling DCI is enabled and an offset between the DCI and the dynamic CORESET is less than timeDurationForQCL (or if the TCI in the DCI is not configured), then a UE may obtain its QCL assumption for a dynamic PDCCH from an activated TCI state with a lowest ID applicable to the PDCCH (e.g., in an active BWP of a scheduled cell).

In some cases, irrespective of a time offset between a scheduling DCI and a dynamic CORESET, if none of configured TCI states for scheduled PDCCH of the dynamic CORESET contains spatial QCL information ('QCL-TypeD'), a UE may obtain other (non-spatial) QCL assumptions from indicated TCI states for its scheduled dynamic CORESET.

In some cases, if a dynamic CORESET overlaps in time with a CSI-RS symbol, a PDCCH of the dynamic CORESET may be assumed to be QCL'ed with that CSI-RS.

In some cases, a network entity may indicate in a DCI or a MAC-CE that a UE should QCL a dynamic CORESET with one of SRS ports that the UE used.

Figure 15:
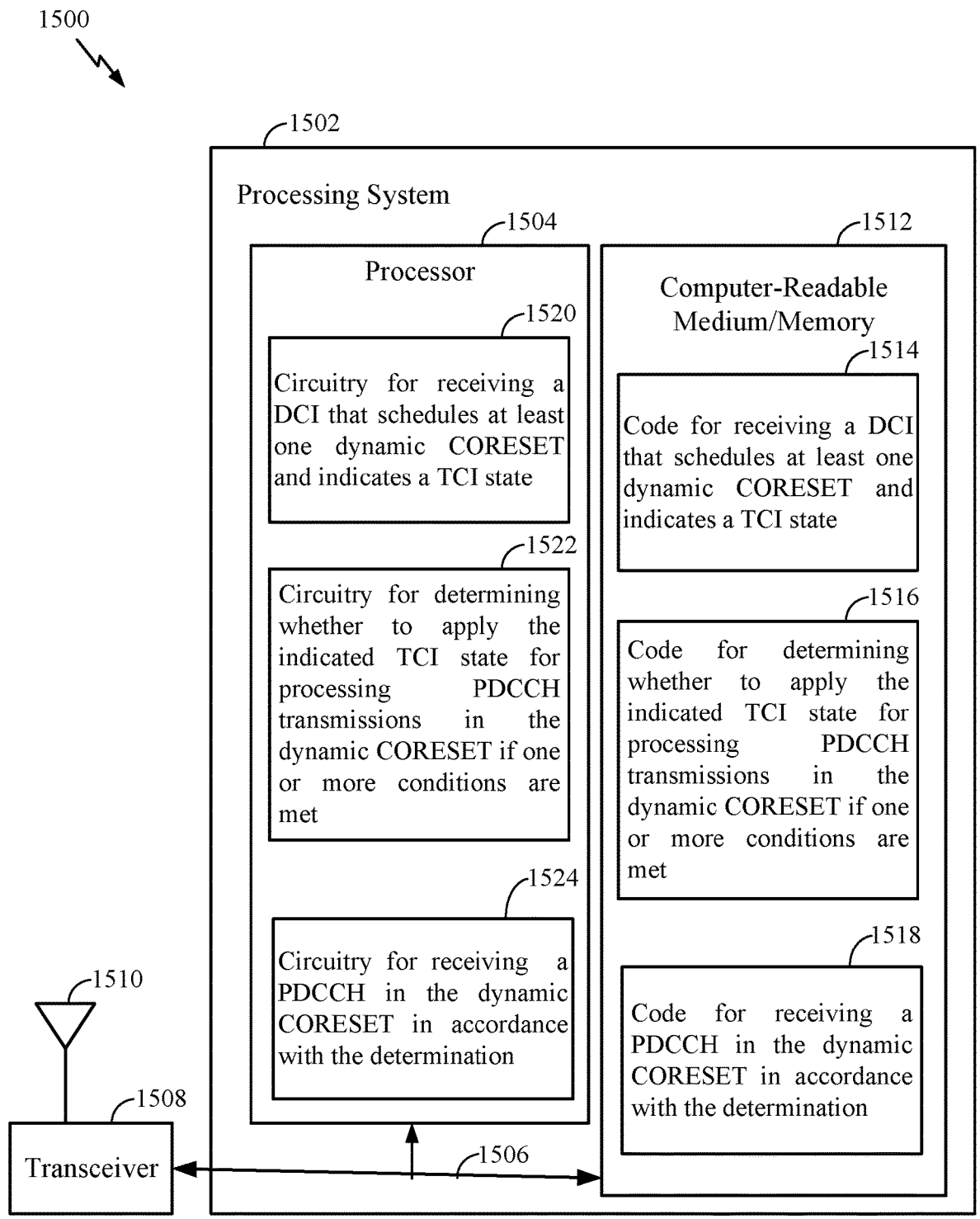
FIG. 15 illustrates a communications devices that may include various components configured to perform operations for the techniques disclosed herein, in accordance with certain aspects of the present disclosure.

FIG. 15 illustrates a communications device 1500 that may include various components (e.g., corresponding to means-plus-function components) configured to perform operations for the techniques disclosed herein, such as the operations illustrated in FIG. 11. The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 11, or other operations for performing the various techniques discussed herein. In certain aspects, computer-readable medium/memory 1512 stores code 1514 for receiving, code 1516 for determining, and code 1518 for receiving. The code 1514 for receiving may include code for receiving a DCI that schedules at least one dynamic CORESET and indicates a TCI state from a list of one or more TCI states for the dynamic. The code 1516 for determining may include code for determining whether to apply the indicated TCI state for processing PDCCH transmissions in the dynamic CORESET if one or more conditions are met. The code 1518 for receiving may include for receiving a PDCCH in the dynamic CORESET in accordance with the determination.

The processor 1504 may include circuitry configured to implement the code stored in the computer-readable medium/memory 1512, such as for performing the operations illustrated in FIG. 11, as well as other operations for performing the various techniques discussed herein. For example, the processor 1504 includes circuitry 1520 for receiving, circuitry 1522 for determining, and circuitry 1524 for receiving. The circuitry 1520 for receiving may include circuitry for receiving a DCI that schedules at least one dynamic CORESET and indicates a TCI state from a list of one or more TCI states for the dynamic CORESET. The circuitry 1522 for determining may include circuitry for determining whether to apply the indicated TCI state for processing PDCCH transmissions in the dynamic CORESET if one or more conditions are met. The circuitry 1524 for receiving may include circuitry for receiving a PDCCH in the dynamic CORESET in accordance with the determination.

Figure 16:
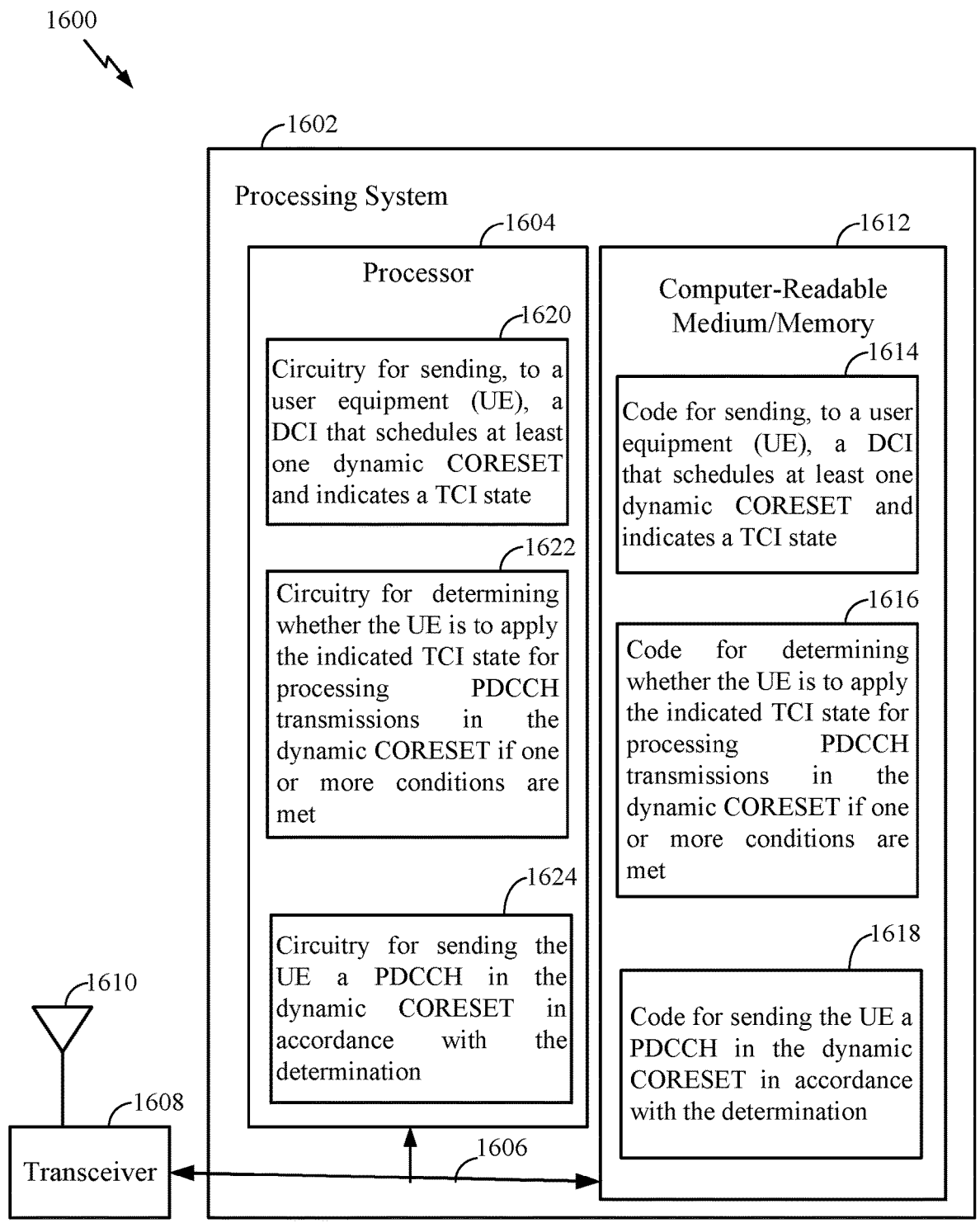
FIG. 16 illustrates a communications device that may include various components configured to perform operations for techniques disclosed herein, in accordance with certain aspects of the present disclosure.

FIG. 16 illustrates a communications device 1600 that may include various components (e.g., corresponding to means-plus-function components) configured to perform operations for the techniques disclosed herein, such as the operations illustrated in FIG. 12. The communications device 1600 includes a processing system 1602 coupled to a transceiver 1608 (e.g., a transmitter and/or a receiver). The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIG. 12, or other operations for performing the various techniques discussed herein. In certain aspects, computer-readable medium/memory 1612 stores code 1614 for sending, code 1616 for determining, and code 1618 for sending. The code 1614 for sending may include code for sending, to a UE, a DCI that schedules at least one dynamic CORESET and indicates a TCI state from a list of one or more TCI states for the dynamic CORESET. The code 1616 for determining may include for determining whether the UE is to apply the indicated TCI state for processing PDCCH transmissions in the dynamic CORESET if one or more conditions are met. The code 1618 for sending may include for code for sending the UE a PDCCH in the dynamic CORESET in accordance with the determination.

The processor 1604 may include circuitry configured to implement the code stored in the computer-readable medium/memory 1612, such as for performing the operations illustrated in FIG. 12, as well as other operations for performing the various techniques discussed herein. For example, the processor 1604 includes circuitry 1620 for sending, circuitry 1622 for determining, and circuitry 1624 for sending. The circuitry 1620 for sending may include circuitry for sending, to a UE, a DCI that schedules at least one dynamic CORESET and indicates a TCI state from a list of one or more TCI states for the dynamic CORESET. The circuitry 1622 for determining may include circuitry for determining whether the UE is to apply the indicated TCI state for processing PDCCH transmissions in the dynamic CORESET if one or more conditions are met. The circuitry 1624 for sending may include the circuitry for sending the UE a PDCCH in the dynamic CORESET in accordance with the determination.

Example Aspects

Implementation examples are described in the following numbered aspects.

In a first aspect, a method for wireless communications by a user equipment (UE), comprising: receiving a downlink control information (DCI) that schedules at least one dynamic control resource set (CORESET) and indicates a transmission configuration indicator (TCI) state, from a list of one or more TCI states, for the dynamic CORESET; determining whether to apply the indicated TCI state for processing physical downlink control channel (PDCCH) transmissions in the dynamic CORESET if one or more conditions are met; and receiving a PDCCH in the dynamic CORESET in accordance with the determination.

In a second aspect, alone or in combination with the first aspect, the one or more conditions comprise a time offset between the DCI of the PDCCH that indicated the TCI state and the dynamic CORESET being equal to or greater than a time duration parameter that indicates a minimum time the UE is able to apply the TCI state from the time the TCI state is indicated.

In a third aspect, alone or in combination with one or more of the first and second aspects, the time duration parameter is based on at least one of: an existing parameter reused for the dynamic CORESET, a separate capability parameter for the dynamic CORESET, or the existing parameter with scaling applied if a subcarrier spacing (SCS) of the PDCCH of the dynamic CORESET is different than an SCS of a channel associated with the existing parameter.

In a fourth aspect, alone or in combination with one or more of the first through third aspects, receiving radio resource control (RRC) signaling indicating whether a TCI field is present in the DCI that schedules the dynamic CORESET, and wherein an indication of whether the TCI field is present in the DCI that schedules the dynamic CORESET is provided via an existing field reused for the dynamic CORESET or based on a separate field or information element (IE) defined for the dynamic CORESET.

In a fifth aspect, alone or in combination with one or more of the first through fourth aspects, the TCI state is indicated via a TCI field in the DCI that schedules the dynamic CORESET, and wherein the TCI field comprises an existing field reused for the dynamic CORESET or the TCI field is defined for the dynamic CORESET.

In a sixth aspect, alone or in combination with one or more of the first through fifth aspects, the TCI state is indicated via a TCI field in an uplink (UL) DCI that schedules the dynamic CORESET.

In a seventh aspect, alone or in combination with one or more of the first through sixth aspects, the list of the one or more TCI states corresponds to a same TCI state list configured for a physical downlink shared channel (PDSCH); or the list of the one or more TCI states is configured separately for the dynamic CORESET.

In an eighth aspect, alone or in combination with one or more of the first through seventh aspects, N TCI states of the list of the one or more TCI states are mapped to code points of a TCI field in the DCI for the dynamic CORESET.

In a ninth aspect, alone or in combination with one or more of the first through eighth aspects, the mapping of the N TCI states is separate from a mapping of TCI states to DCI code points of a TCI field for a physical downlink shared channel (PDSCH)); and wherein parameters or rules for the mapping of the N TCI states are received via radio resource control (RRC) signaling; and wherein a command is received to perform the mapping of the N TCI states via at least one of a medium access control (MAC) control element (CE) or the DCI; and wherein an acknowledgment is sent in response to the DCI and a timing to when the UE is able to apply new TCI states starts from sending the acknowledgment.

In a tenth aspect, alone or in combination with one or more of the first through ninth aspects, the dynamic CORESET reuses same activated TCI states as a physical downlink shared channel (PDSCH), and wherein information for a down-selection of the TCI state for the dynamic CORESET is conveyed via the DCI or a medium access control (MAC) control element (CE).

In an eleventh aspect, alone or in combination with one or more of the first through tenth aspects, receiving the MAC CE that is used only for a TCI state activation, and wherein the MAC CE comprises a serving cell ID, a CORESET ID, and a bit for the TCI state activation or deactivation.

In a twelfth aspect, alone or in combination with one or more of the first through eleventh aspects, when the time offset is greater than or equal to a value specified in the time duration parameter and the dynamic CORESET is scheduled by the DCI comprising a TCI field, a PDCCH port for the dynamic CORESET is quasi co-located with one or more reference signals (RS) in the TCI state indicated by the TCI field.

In a thirteenth aspect, alone or in combination with one or more of the first through twelfth aspects, when the UE is not signaled TCI states, the UE does not receive signaling activating the TCI state, or when the UE is not signaled an active TCI state for the dynamic CORESET in a sufficient time for the UE to apply for monitoring of the dynamic CORESET, a quasi co-location (QCL) assumption for the dynamic CORESET is determined based on an assumption that a demodulation reference signal (DMRS) of the PDCCH of the dynamic CORESET is quasi co-located with at least one prior downlink (DL) transmission; and wherein the DMRS of the PDCCH is quasi co-located with a synchronization signal block (SSB) that the UE identified during an initial access procedure; and wherein the DMRS of the PDCCH is quasi co-located with: a DMRS for a PDCCH of a CORESET in which the dynamic CORESET is scheduled or a DMRS for a PDCCH of a CORESET with a lowest CORESET ID in a slot before a slot containing the dynamic CORESET; and wherein signaling is received of an indication of how the UE is to determine the QCL assumption based on the assumption that the DMRS of the PDCCH shares a QCL relationship with at least one prior DL transmission.

In a fourteenth aspect, alone or in combination with one or more of the first through thirteenth aspects, when the UE is not signaled TCI states, the UE does not receive signaling activating the TCI state, or when the UE is not signaled an active TCI state for the dynamic CORESET in a sufficient time for the UE to apply for monitoring of the dynamic CORESET, a quasi co-location (QCL) assumption for the dynamic CORESET is determined based on an assumption that a DMRS of the PDCCH of the dynamic CORESET shares a QCL relationship with at least one downlink (DL) reference signal (RS) configured by a latest TCI state for the CORESET in which the PDCCH is detected.

In a fifteenth aspect, alone or in combination with one or more of the first through fourteenth aspects, if the DCI is received on a first component carrier (CC) and the dynamic CORESET is received on a second CC, the UE determines a time duration for applying a quasi co-location (QCL) assumption based on a subcarrier spacing (SCS) of the dynamic CORESET if the SCS of the dynamic CORESET is greater than an SCS of a CORESET in which the DCI is received.

In a sixteenth aspect, alone or in combination with one or more of the first through fifteenth aspects, if the DCI is received on a first component carrier (CC) and the dynamic CORESET is received on a second CC, the UE determines a quasi co-location (QCL) assumption for the dynamic CORESET from an active TCI state with a TCI state ID applicable to the PDCCH in an active bandwidth part (BWP) of the second CC.

In a seventeenth aspect, alone or in combination with one or more of the first through sixteenth aspects, regardless of a time offset between the DCI and the dynamic CORESET, if none of the one or more TCI states contain spatial relation quasi co-location (QCL) information, the UE is configured to obtain QCL assumptions, other than the spatial relation QCL information, from the indicated TCI state for the dynamic CORESET.

In an eighteenth aspect, alone or in combination with one or more of the first through seventeenth aspects, if the dynamic CORESET overlaps in time with a channel state information reference signal (CSI-RS) symbol, the PDCCH of the dynamic CORESET is assumed to be quasi-colocated with the CSI-RS.

In a nineteenth aspect, alone or in combination with one or more of the first through eighteenth aspects, receiving signaling, in the DCI or a medium access control (MAC) control element (CE), indicating the UE to assume that the dynamic CORESET is quasi co-located with a sounding reference signal (SRS) port previously used by the UE.

In a twentieth aspect, a method for wireless communications by a network entity, comprising: sending, to a user equipment (UE), a downlink control information (DCI) that schedules at least one dynamic control resource set (CORESET) and indicates a transmission configuration indicator (TCI) state, from a list of one or more TCI states, for the dynamic CORESET; determining whether the UE is to apply the indicated TCI state for processing physical downlink control channel (PDCCH) transmissions in the dynamic CORESET if one or more conditions are met; and sending the UE a PDCCH in the dynamic CORESET in accordance with the determination.

In a twenty-first aspect, alone or in combination with one or more of the twentieth aspect, the one or more conditions comprise a time offset between the DCI of the PDCCH that indicated the TCI state and the dynamic CORESET being equal to or greater than a time duration parameter that indicates a minimum time the UE is able to apply the TCI state from the time the TCI state is indicated.

In a twenty-second aspect, alone or in combination with one or more of the twentieth and twenty-first aspects, the time duration parameter is based at least one of: an existing parameter reused for the dynamic CORESET, a separate capability parameter for the dynamic CORESET, or the existing parameter with scaling applied if a subcarrier spacing (SCS) of the PDCCH of the dynamic CORESET is different than an SCS of a channel associated with the existing parameter.

In a twenty-third aspect, alone or in combination with one or more of the twentieth through twenty-two aspects, sending the UE, a radio resource control (RRC) signaling indicating whether a TCI field is present in the DCI that schedules the dynamic CORESET, and wherein an indication of whether the TCI field is present in the DCI that schedules the dynamic CORESET is provided via an existing field reused for the dynamic CORESET or based on a separate field or information element (IE) defined for the dynamic CORESET.

In a twenty-fourth aspect, alone or in combination with one or more of the twentieth through twenty-third aspects, the TCI state is indicated via a TCI field in the DCI that schedules the dynamic CORESET, and wherein the TCI field comprises an existing field reused for the dynamic CORESET or the TCI field is defined for the dynamic CORESET.

In a twenty-fifth aspect, alone or in combination with one or more of the twentieth through twenty-fourth aspects, the TCI state is indicated via a TCI field in an uplink (UL) DCI that schedules the dynamic CORESET.

In a twenty-sixth aspect, alone or in combination with one or more of the twentieth through twenty-fifth aspects, the list of the one or more TCI states corresponds to a same TCI state list as configured for a physical downlink shared channel (PDSCH); or the list of the one or more TCI states is configured separately for the dynamic CORESET.

In a twenty-seventh aspect, alone or in combination with one or more of the twentieth through twenty-sixth aspects, N TCI states of the list of the one or more TCI states are mapped to code points of a TCI field in the DCI for the dynamic CORESET.

In a twenty-eighth aspect, alone or in combination with one or more of the twentieth through twenty-seventh aspects, if the network entity does not signal TCI states to the UE, the network entity does not signal the UE signaling activating a TCI state, or if the network entity does not signal the UE an active TCI state for the dynamic CORESET in a sufficient time for the UE to apply for monitoring of the dynamic CORESET, a QCL assumption for the dynamic CORESET is determined based on an assumption that a demodulation reference signal (DMRS) of the PDCCH of the dynamic CORESET is quasi co-located with at least one prior downlink (DL) transmission; and wherein the DMRS of the PDCCH is quasi co-located with a synchronization signal block (SSB) that the UE identified during an initial access procedure; and wherein the DMRS of the PDCCH is quasi co-located with: a DMRS for a PDCCH of a CORESET in which the dynamic CORESET is scheduled or a DMRS for a PDCCH of a CORESET with a lowest CORESET ID in a slot before a slot containing the dynamic CORESET.

An apparatus for wireless communication, comprising at least one processor; and a memory coupled to the at least one processor, the memory comprising code executable by the at least one processor to cause the apparatus to perform the method of any of the first through twenty-eighth aspects.

An apparatus comprising means for performing the method of any of the first through twenty-eighth aspects.

A computer readable medium storing computer executable code thereon for wireless communications that, when executed by at least one processor, cause an apparatus to perform the method of any of the first through twenty-eighth aspects.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/ device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 11-12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:
receiving a downlink control information (DCI) that schedules at least one dynamic control resource set (CORESET) and indicates a transmission configuration indicator (TCI) state, from a list of one or more TCI states, for the at least one dynamic CORESET, wherein the at least one dynamic CORESET is an additional CORESET scheduled between at least two regular CORESETs when there is an increase in a traffic level at the UE;
determining whether to apply the indicated TCI state for processing physical downlink control channel (PDCCH) transmissions in the at least one dynamic CORESET when one or more conditions are met; and
receiving a PDCCH in the at least one dynamic CORESET in accordance with the determination.

2. The method of claim 1, wherein the one or more conditions comprise a time offset between the DCI of the PDCCH that indicated the TCI state and the at least one dynamic CORESET being equal to or greater than a time duration parameter that indicates a minimum time the UE is able to apply the TCI state from the time the TCI state is indicated.

3. The method of claim 2, wherein the time duration parameter is based on at least one of:
an existing parameter reused for the at least one dynamic CORESET,
a separate capability parameter for the at least one dynamic CORESET, or
the existing parameter with scaling applied if a subcarrier spacing (SCS) of the PDCCH of the at least one dynamic CORESET is different than an SCS of a channel associated with the existing parameter.

4. The method of claim 1, further comprising:
receiving radio resource control (RRC) signaling indicating whether a TCI field is present in the DCI that schedules the at least one dynamic CORESET, and wherein an indication of whether the TCI field is present in the DCI that schedules the at least one dynamic CORESET is provided via an existing field reused for the at least one dynamic CORESET or based on a separate field or information element (IE) defined for the at least one dynamic CORESET.

5. The method of claim 1, wherein the TCI state is indicated via a TCI field in the DCI that schedules the at least one dynamic CORESET, and wherein the TCI field comprises an existing field reused for the at least one dynamic CORESET or the TCI field is defined for the at least one dynamic CORESET.

6. The method of claim 1, wherein the TCI state is indicated via a TCI field in an uplink (UL) DCI that schedules the at least one dynamic CORESET.

7. The method of claim 1, wherein:
the list of the one or more TCI states corresponds to a same TCI state list configured for a physical downlink shared channel (PDSCH); or
the list of the one or more TCI states is configured separately for the at least one dynamic CORESET.

8. The method of claim 1, wherein N TCI states of the list of the one or more TCI states are mapped to code points of a TCI field in the DCI for the at least one dynamic CORESET.

9. The method of claim 8, wherein the mapping of the N TCI states is separate from a mapping of TCI states to DCI code points of a TCI field for a physical downlink shared channel (PDSCH); and wherein parameters or rules for the mapping of the N TCI states are received via radio resource control (RRC) signaling; and wherein a command is received to perform the mapping of the N TCI states via at least one of a medium access control (MAC) control element (CE) or the DCI; and wherein an acknowledgment is sent in response to the DCI and a timing to when the UE is able to apply new TCI states starts from sending the acknowledgment.

10. The method of claim 8, wherein the at least one dynamic CORESET reuses same activated TCI states as a physical downlink shared channel (PDSCH), and wherein information for a down-selection of the TCI state for the at least one dynamic CORESET is conveyed via the DCI or a medium access control (MAC) control element (CE).

11. The method of claim 9, further comprising:
receiving the MAC CE that is used only for a TCI state activation, and wherein the MAC CE comprises a serving cell ID, a CORESET ID, and a bit for the TCI state activation or deactivation.

12. The method of claim 2, wherein when the time offset is greater than or equal to a value specified in the time duration parameter and the at least one dynamic CORESET is scheduled by the DCI comprising a TCI field, a PDCCH port for the at least one dynamic CORESET is quasi co-located with one or more reference signals (RS) in the TCI state indicated by the TCI field.

13. The method of claim 1, wherein when the UE is not signaled TCI states, the UE does not receive signaling activating the TCI state, or when the UE is not signaled an active TCI state for the at least one dynamic CORESET in a sufficient time for the UE to apply for monitoring of the at least one dynamic CORESET, a quasi co-location (QCL) assumption for the at least one dynamic CORESET is determined based on an assumption that a demodulation reference signal (DMRS) of the PDCCH of the at least one dynamic CORESET is quasi co-located with at least one prior downlink (DL) transmission; and wherein the DMRS of the PDCCH is quasi co-located with a synchronization signal block (SSB) that the UE identified during an initial access procedure; and wherein the DMRS of the PDCCH is quasi co-located with: a DMRS for a PDCCH of a CORESET in which the at least one dynamic CORESET is scheduled or a DMRS for a PDCCH of a CORESET with a lowest CORESET ID in a slot before a slot containing the at least one dynamic CORESET; and wherein signaling is received of an indication of how the UE is to determine the QCL assumption based on the assumption that the DMRS of the PDCCH shares a QCL relationship with at least one prior DL transmission.

14. The method of claim 1, wherein when the UE is not signaled TCI states, the UE does not receive signaling activating the TCI state, or when the UE is not signaled an active TCI state for the at least one dynamic CORESET in a sufficient time for the UE to apply for monitoring of the at least one dynamic CORESET, a quasi co-location (QCL) assumption for the at least one dynamic CORESET is determined based on an assumption that a DMRS of the PDCCH of the at least one dynamic CORESET shares a QCL relationship with at least one downlink (DL) reference signal (RS) configured by a latest TCI state for the CORESET in which the PDCCH is detected.

15. The method of claim 1, wherein, if the DCI is received on a first component carrier (CC) and the at least one dynamic CORESET is received on a second CC, the UE determines a time duration for applying a quasi co-location (QCL) assumption based on a subcarrier spacing (SCS) of the at least one dynamic CORESET if the SCS of the at least one dynamic CORESET is greater than an SCS of a CORESET in which the DCI is received.

16. The method of claim 1, wherein, if the DCI is received on a first component carrier (CC) and the at least one dynamic CORESET is received on a second CC, the UE determines a quasi co-location (QCL) assumption for the at least one dynamic CORESET from an active TCI state with a TCI state ID applicable to the PDCCH in an active bandwidth part (BWP) of the second CC.

17. The method of claim 1, wherein regardless of a time offset between the DCI and the at least one dynamic CORESET, if none of the one or more TCI states contain spatial relation quasi co-location (QCL) information, the UE is configured to obtain QCL assumptions, other than the spatial relation QCL information, from the indicated TCI state for the at least one dynamic CORESET.

18. The method of claim 1, wherein if the at least one dynamic CORESET overlaps in time with a channel state information reference signal (CSI-RS) symbol, the PDCCH of the at least one dynamic CORESET is assumed to be quasi-colocated with the CSI-RS.

19. The method of claim 1, further comprising:
receiving signaling, in the DCI or a medium access control (MAC) control element (CE), indicating the UE to assume that the at least one dynamic CORESET is quasi co-located with a sounding reference signal (SRS) port previously used by the UE.

20. A method for wireless communications by a network entity, comprising:
sending, to a user equipment (UE), a downlink control information (DCI) that schedules at least one dynamic control resource set (CORESET) and indicates a transmission configuration indicator (TCI) state, from a list of one or more TCI states, for the at least one dynamic CORESET, wherein the at least one dynamic CORESET is an additional CORESET scheduled between at least two regular CORESETs when there is an increase in a traffic level at the UE;
determining whether the UE is to apply the indicated TCI state for processing physical downlink control channel (PDCCH) transmissions in the at least one dynamic CORESET when one or more conditions are met; and
sending the UE a PDCCH in the at least one dynamic CORESET in accordance with the determination.

21. The method of claim 20, wherein the one or more conditions comprise a time offset between the DCI of the PDCCH that indicated the TCI state and the at least one dynamic CORESET being equal to or greater than a time duration parameter that indicates a minimum time the UE is able to apply the TCI state from the time the TCI state is indicated.

22. The method of claim 21, wherein the time duration parameter is based at least one of:
an existing parameter reused for the at least one dynamic CORESET,
a separate capability parameter for the at least one dynamic CORESET, or
the existing parameter with scaling applied if a subcarrier spacing (SCS) of the PDCCH of the at least one dynamic CORESET is different than an SCS of a channel associated with the existing parameter.

23. The method of claim 20, further comprising:
sending the UE, a radio resource control (RRC) signaling indicating whether a TCI field is present in the DCI that schedules the at least one dynamic CORESET, and wherein an indication of whether the TCI field is present in the DCI that schedules the at least one dynamic CORESET is provided via an existing field reused for the at least one dynamic CORESET or based on a separate field or information element (IE) defined for the at least one dynamic CORESET.

24. The method of claim 20, wherein the TCI state is indicated via a TCI field in the DCI that schedules the at least one dynamic CORESET, and wherein the TCI field comprises an existing field reused for the at least one dynamic CORESET or the TCI field is defined for the at least one dynamic CORESET.

25. The method of claim 20, wherein the TCI state is indicated via a TCI field in an uplink (UL) DCI that schedules the at least one dynamic CORESET.

26. The method of claim 20, wherein:
the list of the one or more TCI states corresponds to a same TCI state list as configured for a physical downlink shared channel (PDSCH); or
the list of the one or more TCI states is configured separately for the at least one dynamic CORESET.

27. The method of claim 20, wherein N TCI states of the list of the one or more TCI states are mapped to code points of a TCI field in the DCI for the at least one dynamic CORESET.

28. The method of claim 20, wherein, if the network entity does not signal TCI states to the UE, the network entity does not signal the UE signaling activating a TCI state, or if the network entity does not signal the UE an active TCI state for the at least one dynamic CORESET in a sufficient time for the UE to apply for monitoring of the at least one dynamic CORESET, a QCL assumption for the at least one dynamic CORESET is determined based on an assumption that a demodulation reference signal (DMRS) of the PDCCH of the at least one dynamic CORESET is quasi co-located with at least one prior downlink (DL) transmission; and wherein the DMRS of the PDCCH is quasi co-located with a synchronization signal block (SSB) that the UE identified during an initial access procedure; and wherein the DMRS of the PDCCH is quasi co-located with: a DMRS for a PDCCH of a CORESET in which the at least one dynamic CORESET is scheduled or a DMRS for a PDCCH of a CORESET with a lowest CORESET ID in a slot before a slot containing the at least one dynamic CORESET.

29. An apparatus for wireless communications by a user equipment (UE), comprising:
at least one processor and a memory configured to:
receive a downlink control information (DCI) that schedules at least one dynamic control resource set (CORESET) and indicates a transmission configuration indicator (TCI) state, from a list of one or more TCI states, for the at least one dynamic CORESET, wherein the at least one dynamic CORESET is an additional CORESET scheduled between at least two regular CORESETs when there is an increase in a traffic level at the UE;
determine whether to apply the indicated TCI state for processing physical downlink control channel (PDCCH) transmissions in the at least one dynamic CORESET when one or more conditions are met; and
receive a PDCCH in the at least one dynamic CORESET in accordance with the determination.

30. An apparatus for wireless communications by a network entity, comprising:
at least one processor and a memory configured to:
send, to a user equipment (UE), a downlink control information (DCI) that schedules at least one dynamic control resource set (CORESET) and indicates a transmission configuration indicator (TCI) state, from a list of one or more TCI states, for the at least one dynamic CORESET, wherein the at least one dynamic CORESET is an additional CORESET scheduled between at least two regular CORESETs when there is an increase in a traffic level at the UE;
determine whether the UE is to apply the indicated TCI state for processing physical downlink control channel (PDCCH) transmissions in the at least one dynamic CORESET when one or more conditions are met; and
send the UE a PDCCH in the at least one dynamic CORESET in accordance with the determination.

* * * * *